United States Patent
Shacklett, III et al.

(10) Patent No.: US 6,294,111 B1
(45) Date of Patent: Sep. 25, 2001

(54) ELECTROCHROMIC INKS

(75) Inventors: James H. Shacklett, III, Gwynned Valley; Philip M. Henry, Morrisville; Richard Snyder, Gilbertsville; Robert Anthony, Norristown, all of PA (US)

(73) Assignee: Steinbeis IBL GmbH, Meerene (DE)

( * ) Notice: Subject to any disclaimer, the term of this patent is extended or adjusted under 35 U.S.C. 154(b) by 0 days.

(21) Appl. No.: 09/136,951

(22) Filed: Aug. 20, 1998

Related U.S. Application Data

(62) Division of application No. 08/724,349, filed on Oct. 1, 1996, now abandoned.

(51) Int. Cl.$^7$ ............... H01B 1/20; C25D 13/06; C25D 13/10
(52) U.S. Cl. ................. 252/518.1; 252/520.4; 252/520.5; 205/78; 205/109; 205/158
(58) Field of Search .............. 252/518.1, 520.4, 252/520.5; 205/78, 109, 158

(56) References Cited

U.S. PATENT DOCUMENTS

| | | |
|---|---|---|
| 4,116,535 | 9/1978 | Ponjee et al. . |
| 4,188,095 | 2/1980 | Nishimura et al. . |
| 4,374,001 | 2/1983 | Bernier . |
| 4,522,888 | 6/1985 | Eichelberger et al. . |
| 5,054,894 | 10/1991 | Warszawski . |
| 5,056,899 | 10/1991 | Warszawski . |
| 5,059,895 | 10/1991 | Cataldi et al. . |
| 5,074,648 | 12/1991 | Warszawski . |
| 5,078,480 | 1/1992 | Warszawski . |
| 5,080,470 * | 1/1992 | Warszawski ............ 359/265 |
| 5,082,355 | 1/1992 | Warszawski . |
| 5,141,622 | 8/1992 | Fauteux et al. . |
| 5,227,223 | 7/1993 | Morgan et al. . |
| 5,418,086 | 5/1995 | Bailey . |
| 5,500,759 | 3/1996 | Coleman . |
| 5,654,640 | 8/1997 | Bailey . |
| 5,672,440 | 9/1997 | Bailey . |

* cited by examiner

Primary Examiner—Mark Kopec
(74) Attorney, Agent, or Firm—Baker & McKenzie; Ronald D. Trice; Adam C. Underwood

(57) ABSTRACT

Apparatus and methods for manufacturing electrochromic cells. Layers of various inks are printed on substrates by high speed printing means. The electrochromic cells comprise layers of electrode, electrolyte, and counter electrode ink materials which are printed on at least one substrate. When an electrical voltage differential is introduced between the electrode and counter electrode layers, an electrochemical reaction occurs in the electrochemical cell.

25 Claims, 11 Drawing Sheets

ELECTROCHROMIC INKS

RELATED APPLICATION

This application is divisional of application Ser. No. 08/724,349 filed on Oct. 1, 1996 abandoned.

FIELD OF THE INVENTION

The present invention relates in general to the manufacture of electrochromic devices, and, more particularly, to an apparatus and method for assembling electrochromic cells which, when activated, produce a visual change of state and may be adapted for use in a variety of devices.

BACKGROUND OF THE INVENTION

Electrochromic cells of various designs have been proposed for use in such diverse apparatus as graphics displays, wrist watch displays, variable transmission windows and mirrors, and voltage or state-of-charge indicators for batteries, among others. Although their specific constructions may vary considerably depending on their intended application, most electrochromic devices possess several common characteristic features. Typically, an electrochromic device is comprised of an electrochemical cell having a first electrically conductive electrode which functions as cathode, a second electrically conductive electrode which functions as an anode, and a medium through which the first and second electrodes communicate to effectuate a visible change in the cell under the application of a DC voltage applied to a circuit including the first and second electrodes. The medium through which the electrodes communicate normally assumes the form of solid, semi-solid or liquid electrolyte. Any of the electrodes and the electrolyte may comprise an electrochromic material which responds to the current induced by the applied DC voltage so as to produce the desired visible change in the cell.

The operation of an electrochemical cell may produce permanent or reversible ionization or deionization of metals contained in either the electrolyte and/or at least one of the electrodes which results in an oxidation or reduction (redox) reaction at the respective electrodes. The cell is usually a confined space wherein the first and second electrodes are separated from one another by the electrolyte, possibly in conjunction with a spacing means. In addition, the cell normally includes at least one substrate, which may be fabricated from flexible or rigid material, through which the metallic deposition or dissolution occurring within the cell may be observed. For example, the visible change in the cell may be observed through the substrate if the substrate is substantially transparent or if the substrate contains an orifice or window through which the visible change may be observed.

Examples of electrochemical devices defined by enclosed cells with rigid substrates and a liquid electrolyte in communication with first and second electrodes include U.S. Pat. Nos. 4,116,535, 4,188,095, 4,285,575 and 4,902,108.

U.S. Pat. No. 5,411,817 discloses a charge indicator for a battery, in which a layer, between an electrode pair, comprises an antioxidant, a photographic color coupler dispersion and a photographic color developer. Various possible compositions for this layer are disclosed, but within the constraints just described, no disclosure appears to be provided to the effect that the electrochemical process, in which electrolyte color is transformed, is reversible without reversing the polarity of the electrodes. The other alternative applications disclosed, as a disposable electric meter and a "phone card," appear to imply that the electrochemical process is not reversible.

U.S. Pat. No. 3,720,869 discloses a method of determining a state-of-charge condition of an electrode in an electric cell by measuring the resistance of a cell electrode by its conversion between a metallic and non-metallic phase.

U.S. Pat. No. 3,667,039 discloses measuring instruments utilizing liquid crystalline elements that exhibit visible change in response to input signals above given threshold levels.

Several U.S. patents to Warszawski disclose light modulating devices as well as processes for making or using the same. These are U.S. Pat. Nos. 5,054,894, 5,056,899, 5,074,648, 5,078,480, 5,080,470 and 5,082,355. The substantive disclosures of all six of these patents are virtually identical. Thus, for convenience, these patents will be collectively referred to as the "Warszawski patents."

The Warszawski patents disclose numerous embodiments in the way of realizing several different types of light modulating devices, e.g., in large-scale environments, such as large signs in public locales. These patents emphasize maintaining the structural integrity of the light modulating devices disclosed, particularly in the case of large-scale devices, such that the electrolyte-electrode interfaces will not be unduly affected by local discontinuities and/or stresses.

To this end, the Warszawski patents propose the use of electrolyte layers, between opposing electrodes, that maintain a high degree of flexibility, and it is specifically proposed that the electrolyte material be plastic or viscoelastic. Also for the purpose of maintaining structural cohesion, it is proposed that the electrolyte layers either be provided with a separate adhesive or be self-adhesive themselves, to ensure adequate bonding with the electrodes.

Although the Warszawski patents appear to contemplate the use of electrodes that are not necessarily flat, there appears to be no teaching or suggestion to the effect of rendering the electrodes themselves as flexible. Thus, it would appear the Warszawski patents, while contemplating the use of flexible electrolyte layers, assume that the electrodes flanking the electrolyte layer(s) will essentially be rigid. This would appear to be particularly true in the case of large-scale public signs.

With regard to the manufacture of the light modulating devices disclosed in the Warszawski patents, different techniques are proposed, such as thick-film application techniques and cut-out techniques. The thick-film application techniques involve silk screening, air gap, helical wire bar and related techniques. The cut-out techniques involve, for example, the production of a composite, that includes an electrode with the electrolyte, and then applying the composite to another electrode. Contemplated are techniques such as extrusion, rolling, calendering, coating and the like, as well as punching, stamping and laser cutting.

U.S. Pat. No. 4,497,881 describes a battery charge indicator that is essentially formed from components already present within the battery itself. Particularly, there is disposed within the battery a charge producing compound which apparently could constitute the electrolyte, the anode gel, the cathode material or a combination of two or more of such compounds. This charge producing compound is provided just within the outer cylindrical surface of the battery housing and is configured to adopt a given color, such as black, when the battery has a full charge and gradually changes to a different color, such as gray, when the battery charge is depleted. A small hole or window is provided in the outer surface of the battery housing in order to enable the user to view the color of the charge producing compound. This patent appears to emphasize the use of materials already present in a conventional battery, rather than adding additional compounds or structures for indicating color.

U.S. Pat. No. 4,917,973 discloses a secondary battery in which one of the electrodes of the battery itself changes color in accordance with the voltage between the positive and negative electrodes of the battery. A window or hole is provided for viewing the color change of the aforementioned electrode. This patent appears to be limited solely to secondary batteries, i.e. significantly small, generally disk-shaped batteries.

U.S. Pat. No. 5,256,500 teaches a battery, such as a lithium battery, having a built-in lifetime indicator. Primarily, this patent is directed to lithium batteries, but also contemplates that the invention disclosed therein be utilized in conjunction with other types of batteries, such as manganese batteries and nickel cadmium batteries. It is generally suggested that an "indication element", as part of a "lifetime indicator" be provided within the battery itself. Various types of indicators are contemplated, such as electrochromism elements, electrophonetic cells and liquid crystal cells. In one embodiment, a "lifetime indicator" can be selectively mountable and dismountable with respect to a positive pull container of the battery. In this manner, the lifetime indicator can be mounted onto the battery only when it is desired to take a reading. For this embodiment, it appears that such a lifetime indicator be selectively mountable and dismountable via threaded engagements with the aforementioned positive pull container. No other possible embodiments of a removable lifetime indicator are disclosed.

U.S. Pat. Nos. 5,250,905, 5,396,177, 5,339,024, 5,418,086 and published PCT Application No. PCT/US92/07757 (International Publication No. WO 93/06474) variously describe batteries having externally mounted electrochemical tester devices. The tester devices themselves include the essential electrochemical cell components of a cathodic electrode, an electrolyte and an anodic electrode arranged in a label applied directly to the housing of a battery. In each of these references, the tester device is connected in constant parallel relation with the battery's terminals so as to provide a continuous reading of the battery's state of charge. The state of charge is determined as a function of the depletion or dissolution of the anodic electrode under the influence of the applied DC voltage. The testers also include an electrolyte which may be either a solid or a porous polymeric film matrix containing electrolyte solution. If solid, the electrolyte may be too brittle to withstand the externally applied forces and mechanical shock encountered by a battery under normal shipping, handling and usage. In these circumstances, the solid electrolyte may fracture, thereby severing communication between the electrodes and disabling the tester. Alternatively, when formed as a film matrix, the electrolyte must be preformed and thereafter applied to an electrode in a separate and distinct manufacturing step, thereby complicating and lengthening the label manufacturing process as well as adding to its expense.

U.S. Pat. Nos. 5,418,085 and 5,494,496 describe electrochemical battery tester devices which may be integrally affixed to an end of a battery. These references generally discuss electrochromic materials and that such materials may be printed on a substrate but offer no specific teachings of the details of how these materials may be printed under actual manufacturing conditions to produce an operable device. More particularly, there is no substantive discussion of the preferred compositions of the electrochromic materials and how these materials are selected and/or adapted to reliably perform under the rigors of normal manufacturing, shipping handling and usage of the battery. Nor is there any disclosure of whether such materials may be effective when borne by a tester label surrounding the circumference of a battery, which region is typically subject to greater and more frequent mechanical shock then the ends of a battery.

U.S. Pat. No. 5,458,992 teaches an electrochromic battery tester device that may be integrated into a battery label affixable to the circumferential wall of a battery housing. The electrolyte component of the electrochromic tester disclosed therein may be a solid or a thickened solution. If solid, the electrolyte may experience the aforementioned fracture failure under normal manufacturing, shipping, handling and usage of the label and battery. If formed as a thickened solution, there is no assurance that the solution may maintain its electrolytic properties throughout the useful service life of the battery, especially if the solution dries and the continuous presence of a threshold level of moisture is necessary for preserving electrolytic activity in the electrolyte and concomitant viability of the electrochromic cell. General references are made to methods of assembling the electrochromic cell by printing a label substrate using conductive and electrochemically active inks or paints. There is no disclosure however, apart from identification of certain active materials and thickeners, of specific ways or formulations by which such materials may be combined to produce viable inks or paints suitable for high speed printing.

An advantage exists, therefore, for an apparatus and method for producing, at high speeds, an inexpensive, thin film electrochromic cell which may be constructed as a series of preferably non-preformed layers applied to one or more flexible or rigid substrates, wherein each of the several layers may be deposited by coating or printing apparatus, and wherein the layers, including any electrode and electrolyte layers, maintain their as-applied structural and functional characteristics throughout the useful service life of the electrochromic device with which the cell may be used.

Although state-of-the-art high speed printing and coating techniques would appear to provide an apparent means for producing electrochromic cells, significant problems must be overcome in constructing electrochromic cells by such means. For example, the composition of each graphic and, particularly, functional ink used to construct the cell is critical because the inks' compositions dictate their electrical, chemical and mechanical properties and printability characteristics, and also because ink solvents occasionally tend to react detrimentally with the substrate materials to which the inks are applied. Because of these difficulties, conventional printing and coating products, processes and apparatus have not heretofore been used to assemble a functional and reliable electrochromic cell.

Accordingly, there exists a need for a versatile, high-speed, economical process and apparatus for making thin film electrochromic cells for a variety of devices. There also exists a need for processes, apparatus and electrochromic cell constituent materials which produce an electrochromic cell and/or device with indicia bearing surfaces to which permanent or temporary color graphics may be applied without interfering with the functionality of the electrochromic cell.

SUMMARY OF THE INVENTION

The present invention comprises a method and apparatus for constructing an electrochromic cell from a series of preferably non-preformed layers applied to one or more flexible or rigid substrates, wherein each of the several layers may be deposited by high-speed coating or printing techniques. The functional layers of the electrochromic cell are applied as inks or materials with the properties and/or characteristics of inks (collectively referred to herein as "ink" or "links") wherein each ink partially or completely dries to form a solid or semi-solid layer. The present invention further comprises an economical process for making a variety of thin film electrochromic cells and/or thin film electrochromic devices which comprise an electrochromic cell (collectively referred to herein as "electrochromic cell" or "cells"). The invention further comprises a versatile apparatus which may be utilized to produce electrochromic cells and devices of various constructions which include functional and/or graphical elements.

The process and apparatus of this invention may be adapted to any printing process such as screen printing, sputtering, letterpress, flexography, lithographic printing, offset lithography, serigraphy or intaglio printing. Any one of these printing techniques may be employed to produce an electrochromic cell or device. Alternatively, an electrochromic cell or device may be produced by employing two or more of these printing techniques.

A presently preferred printing process for achieving the objectives of the invention is intaglio printing. Intaglio printing employs either flat plates or printing cylinders comprising so-called "image carriers" which are used to apply the inks to a desired substrate. The image carriers used in intaglio printing differ from image carriers used in other printing processes inasmuch as intaglio image carriers have an image cut or etched below the surface of the non-image area of the image carrier. Intaglio plate printing is used to print currency and art reproductions. Although intaglio plate printing produces a high quality printed product, plate printing utilizes highly viscous ink and requires high pressure to transfer images from the plate to the substrate.

Accordingly, it is presently preferred to utilize print cylinders which allows for the use of less viscous inks which readily transfer to any desired substrate. The printing cylinders of this invention may be engraved and then, optionally, chemically etched (as described in further detail below) so as to increase the volume of ink deposited in any particular layer of the electrochromic cell.

The image engraved on the cylinder is screened. Each square inch of engraved area has between about 2,000 and 90,000 cells engraved in the surface. The actual size and number of cells is determined by density of the ink required by the final printed image. Breaking all images into screens makes it possible for the engraved image to retain a fluid ink of low viscosity until the ink is to be applied. The printing process which utilizes such an engraved cylinder is known as "rotogravure" or "gravure" printing.

Rotogravure printing is preferred because of its consistency and versatility in repetitive printing applications where consistency and uniform application or printed layers are required. Current rotogravure printing processes have primarily focused on the relatively simple processes and conventional ink materials associated with printing of graphic colored inks on various substrates. The present invention likewise addresses those techniques as well, while also introducing novel methods, apparatus and materials for printing inks which comprise the functional components of an electrochromic cell.

The image carrier employed in rotogravure printing processes usually comprises a cylinder having a steel or aluminum core. The core is electroplated with copper and engraved in the reverse of the desired printed shape so that the "image carrier areas" (the areas in which ink is deposited prior to application) are below the surface of the cylinder. The entire cylinder is then chrome plated to increase the useful life of the engraving.

The present inventors have observed that printing cylinders employed by rotogravure presses for conventional graphics printing purposes were found to be incapable of depositing sufficient volumes and thicknesses of the various inks required to construct thin film electrochromic cells. The printing cylinders of the present invention overcome these deficiencies by being first electronically engraved and then chemically etched by, for example, acid (such as HCL) or other such etching formulations to produce the appropriate volume and shape of each image carrier area.

Chemical etching increases the overall volume within the engraved portion of the image carrier area by increasing the surface area of the cells formed by engraving. As such, the chemically etched printing cylinders may deposit ink layers of greater thickness and uniformity than those which may be applied by cylinders subjected solely to mechanical etching.

A rotogravure press generally comprises one or more printing stations wherein each printing station typically includes an engraved image carrying cylinder, an ink fountain, a doctor blade, an impression roller and an ink drying means. As the cylinder rotates, ink is applied to the cylindrical image carrier from the ink fountain and the doctor blade wipes the surface of the cylinder clean prior to printing. The substrate upon which the ink is to be deposited is passed between the cylinder and the impression roller. The cylinder and roller are in contact with the substrate and are positioned such that pressure may be applied to the substrate in order to promote ink transfer. Generally, the cylinder and/or the roller may be adjusted in order to increase or decrease the pressure applied (also referred to herein as "printing pressure").

Rotogravure presses can achieve press speeds in excess of about 3000 feet per minute and may accommodate substrate web widths from under 30 centimeters to about 15 feet or greater. The rotogravure press according to the present invention may comprise one printing station for each ink or layer which is to be applied to the substrate. Each layer of ink may be applied to the substrate and the substrate may be otherwise treated via separate complete passes of the substrate through discrete, unaffiliated printing and treatment stations. Preferably, however, the apparatus of this invention comprises a plurality of serially aligned operative stations. Such operative stations may include one or more of the following: substrate unwind stations, automatic substrate splicing stations, substrate surface tension enhancement stations, one or more functional and/or graphical ink stations, notching stations, registered lamination stations, die cutting stations, rewind stations and/or inspection stations.

Construction of the electrochromic cell of this invention may be carried out by printing graphic and functional layers of the cell on a single flexible or rigid substrate. Alternatively, the cell may be constructed by printing only selected layers on selected ones of two or more flexible or rigid substrates and then joining the individual substrates together to form the completed electrochromic cell. The combination of elements of the electrochromic cell; graphics and other matter applied to each individual substrate may be collectively referred to as a "passe". Where there are two or more passes made during the construction of an electrochromic cell, each pass is identified by number, as for example, "first passe", "second pass", etc.

In multiple pass constructions, once each pass has been printed, the several passes are brought into precise registration with one another and joined to form the completed cell. Prior to the instant invention, it has been difficult if not impossible not only to effectively print the functional components of an electrochromic cell on a substrate but also to align and unite the two or more passes such that their various layers make the desired electrical and physical contact. Thus, the process of this invention introduces a highly accurate and reliable means of registered lamination which may be carried out in such a way that a second pass may be printed and immediately thereafter precisely laminated to a first pass as the preprinted first pass is fed from an unwind station.

As is apparent from the foregoing discussion, the formulation of each ink is critical to producing an electrochromic cell reliably and at high speed. If the inks are not of the proper formulation, the layers of each pass may not dry properly, may tend to chemically react with other materials, may fail to adhere to adjacent layers and may tend to cause the substrate to deform or break during processing. Accordingly, the materials necessary for constructing the electrochromic cell of this invention, especially those used to construct the functional electrode and electrolyte layers, are specially formulated inks rather than other conventional ink and non-ink materials.

Further features, objects and advantages of the invention will become apparent to those skilled in the art upon consideration of the following detailed explanation of specific embodiments of the invention, and with reference to the drawings accompanying this specification.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
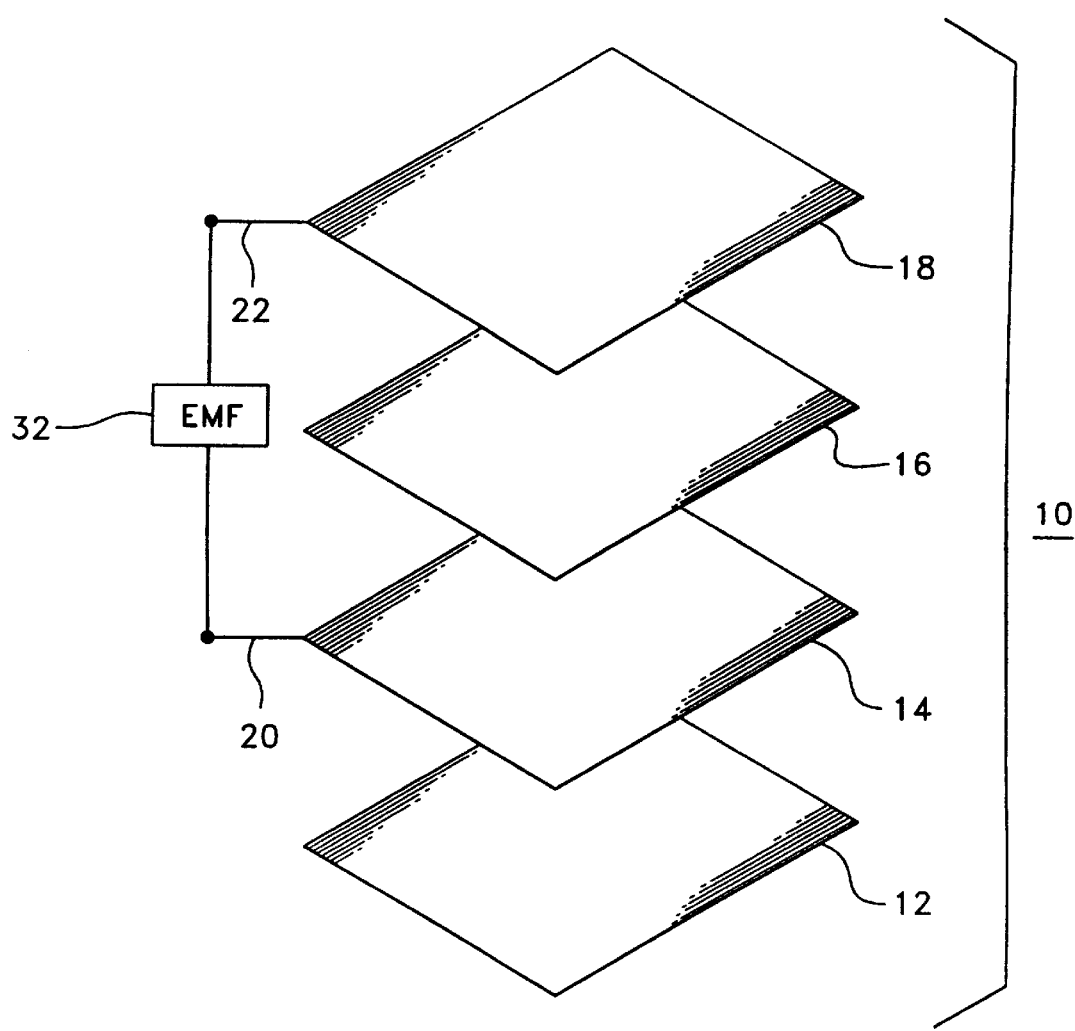
FIG. 1 is an exploded view of the layers of an electrochromic cell arranged in accordance with the present invention.

Referring to the drawings wherein like reference characters designate like or corresponding parts throughout the several views, there is shown in FIG. 1, in schematic form, an exploded view of the several layers comprising an electrochromic device produced according to a first presently preferred embodiment of this invention, which cell is identified generally by reference numeral 10. Electrochromic cell 10 comprises a substrate 12 upon which layers of an electrode material 14, electrolyte material 16, and counter electrode material 18 are printed. Connector electrodes or terminals 20 and 22 may also be printed in electrical communication with electrode layer 14 and counter electrode 18, respectively.

Cell 10 is activated by connecting terminals 20 and 22 to a voltage source, such as a dry cell or other electromotive force producing source (hereinafter referred to as "EMF 32"). EMF 32 may be any suitable electromotive force producing source such as a DC voltage generating battery capable of producing a voltage differential between electrode 14 and counter electrode 18, therein causing an electrochemical reaction, typically exhibited as a visible color change in electrode layer 14. The visible color change in electrode layer 14 may be from one color to another color, from a color to substantially clear or transparent, or from substantially clear or transparent to a color.

For example, where indium tin oxide material and a bismuth based material are employed as electrode 14 and electrolyte 16, respectively, bismuth ions present in electrolyte 16 gain electrons and bismuth metal plates out on electrode 14 causing a visually perceptible change in electrode 14, namely, the indium tin oxide turns from transparent to black.

Terminals 20 and 22 need not be constructed as part of cell 10 so long as there is provided a means by which a voltage differential may be introduced across electrode layer 14 and counter electrode layer 18 to produce the desired electrochemical reaction in cell 10.

Substrate 12 may comprise any flexible or rigid material (1) suitable for accepting one or more layers of graphic and/or functional ink and (2) capable of being rapidly printed by a printing press or other suitable coating/printing apparatus during application of the ink layers. For instance, substrate 12 may be made of a flexible but strong material such as PVC film. The PVC may be shrinkable or non-shrinkable film having a thickness of between about 0.4 mil and 4 mil. Most preferably, the thickness of the PVC laminate is about 1 to 2 mil. A preferred PVC material is film number GE-15 manufactured by Hoechst, Holland, N. V. of Weert, Holland. Alternative materials which may be used as substrate 12 include, without limitation, polypropylene, polyester and polyethylene films.

The choice of materials of construction used for each of the components of cell 10, as well as the order of assembly of such components are largely determined by the specific application for which cell 10 is to be employed. For example, the construction of cell 10 shown in FIG. 1 depicts substrate 12 in contact with electrode layer 14, which is the material normally intended to change state or color during the electrochromic reaction so as to provide a visual indication of such reaction to an observer. Accordingly, to a presently preferred construction of cell 10, electrode layer 14 is substantially transparent in the absence of an applied voltage. Furthermore, substrate 12 is preferably substantially transparent in order for the reaction at electrode layer 14 to be observed.

An alternative construction to the embodiment of cell 10 shown in FIG. 1 would comprise counter electrode 18 being applied directly to substrate 12, and then layers of electrolyte 16 and electrode 14 being subsequently applied in sequence. In this modified embodiment, substrate 12 would not have to be substantially transparent because electrode 14 would not be obscured by any subsequently applied layers.

Accordingly, the process and apparatus of this invention permits the printing of each layer in any order which provides the desired electrochromic reaction to take place. More specifically, the order in which the layers of the embodiment of FIG. 1 are printed may be reversed such that counter electrode 18 is printed first on substrate 12, electrolyte 16 is printed on counter electrode 18, and electrode 14 is printed on electrolyte 16 to form cell 10.

Turning now to the specific characteristics of printed layers 14, 16 and 18, electrode layer 14 may comprise any material formulated according to the present invention that is capable of providing a visual indication of an electrochemical reaction. Typically, this indication is exhibited by a visible change in electrode layer 14. Layer 14, which functions as a cathodic electrode in cell 10, should also be suitable for adhesion to substrate 12 and, preferably, any other layers with which it may be in contact As with all of the layers printed by the process of this invention, electrode layer 14 preferably has the physical characteristics of a printable ink. In addition, the ink of layer 14 preferably has a relatively high electrical conductivity (desirably less than about 50 Ohms/square/mil), and possesses active ingredient(s) having a high affinity to electrochromic reactions such as electroplating and the like. Similar to many of the layers printed by the process of this invention, it is preferable that electrode layer 14 be easily applied in any desired shape and thickness and that it dry rapidly before the application of subsequent layers of cell 10.

The thickness of electrode layer 14 is between about 0.05 and about 5 mil, preferably from about 0.2 mil to 0.3 mil. As with all of the layers printed in accordance with this invention, electrode layer 14 may be printed as a single layer whose thickness may be adjusted by varying the relative concentrations of its essential formulation constituents consistent with the ranges of such constituents hereinafter disclosed. Alternatively, the thickness of layer 14 (and other layers of cell 10) may be increased merely by printing successive layers of ink material.

Inks which may be used as electrode layer 14 include, among others, indium tin oxide ("ITO") based inks, tin oxide based inks, antimony trioxide based inks, and inks having tin oxide doped with hydrogen fluoride. A presently preferred embodiment contemplates ITO based inks to be used as electrode layer 14. A formulation using ITO having the characteristics necessary to produce the desired electrochemical reaction in cell 10 and additionally having the characteristics of a printable ink 10 is believed to be unique. In this connection, a suitable electrode ink developed in accordance with this invention is preferably formulated as follows:

from about 20 to about 80 weight percent (wt %), more preferably about 50 wt %, of at least one plating agent receptor;

from about 5 to about 40 wt %, more preferably about 10 wt %, binding agent; and from about 15 to about 75 wt %, more preferably about 40 wt %, solvent.

The plating agent receptor desirably assumes the form of at least one material that is readily mixable with both the binder and solvent to produce a highly electrically conductive and generally non-tacky ink capable of producing a high quality image (i.e., essentially uniform in coating thickness and coverage consistency) when applied to a substrate. Such materials may suitably include electrically conductive powders of the aforementioned compounds, and preferably comprise ITO powders. Suitable ITO powders include commercially available ITO powders comprised of substantially spherical ITO particles and those comprised of substantially needle or rod shaped ITO particles. A presently preferred embodiment contemplates the electrically conductive powder to comprise from between 0 to 100% ITO powder having substantially spherical particles and from between 0 to 100% ITO powder having substantially needle or rod shaped particles. A particularly preferred ITO powder comprises a blend of about four parts substantially needle or rod shaped particles and about one part substantially spherical particles. The present inventors have discovered that such a blend optimizes the superior electrical conductivity characteristics of the substantially needle or rod shaped particles with the superior substrate coatability characteristics of the substantially spherical particles.

Suitable binding agents include resin systems such as polyvinyl chloride, polyvinyl butyral, acrylic and nitrocellulose, with the preferred resin being vinyl chloride.

And, suitable solvents include normal propyl acetate, ethyl alcohol and water, with the preferred solvent being normal propyl acetate.

A suitable thickness of this formulation of ITO ink when applied as electrode layer 14 may range from between about 0.05 mil and about 5 mil and is preferably about 0.2 mil to about 0.3 mil.

Electrolyte 16 may comprise any material which promotes the electrochemical reaction of cell 10, which may be formulated as a printable ink and which is suitable for adhesion to electrode layer 14 and, preferably, any other layers of cell 10 with which electrolyte 16 will be in contact. Electrolyte 16 preferably comprises at least a humectant, a plating agent, a solvent and a binding agent. Further, the electrolyte material must be of sufficient electrical conductivity to promote an electrochemical reaction in cell 10 under the influence of an applied EMF. The thickness and structural integrity of electrolyte layer 16 must also be sufficient to prevent electrical contact between electrode layer 14 and counter electrode 18. Suitable thicknesses of electrolyte layer 16 may therefore range from between about 0.05 mil and 50 mil, preferably about 1 mil to 10 mil, and most preferably about 3 to 6 mil.

Any electrolyte, whether solid, semi-solid or liquid must maintain a threshold level of moisture in the electrolyte composition in order for the electrolyte to perform its intended function. Accordingly, electrolyte 16 preferably comprises at least one humectant substance. The humectant must have hygroscopic properties sufficient to absorb and maintain moisture throughout the expected useful service life of cell 10. Humectants suitable for the present purposes any of several chlorine, sulfur and bromium salts with a preferred humectant being lithium bromide.

The plating agent desirably assumes the form of at least one material that, under the influence of an applied EMF, electrochemically bonds with or "plates out" on the plating agent receptor material of the electrode layer 14. Such electrochemical reaction may be either permanent or reversible depending on the materials chosen for the plating agent and the plating agent receptor as dictated by the intended service criteria of electrochromic cell 10.

When the electrochemical reaction between the plating agent and plating agent receptor is intended, for instance, to be reversible, the plating agent should be a substance which readily plates out on the plating agent receptor when an appropriate EMF is applied and readily separates from the plating agent receptor and returns to an equilibrium state (perhaps with the assistance of a "scrubbing agent", discussed below) upon the removal or polarity reversal of the EMF.

The plating agent thus desirably comprises at least one salt compound whose constituent ions separate and reunite, respectively, upon application and removal (or reversal) of a comparatively low EMF, such as a DC voltage of about 1.5V, in the presence of a suitable counter electrode. Examples of suitable plating agents include, without limitation, $WO_3$, $MoO_3$, $V_2O_5$, $Nb_2O_3$ and $BiCl_3$ (bismuth trichloride). A presently preferred compound useful as a plating agent is bismuth trichloride, whose positively charged bismuth ions are drawn to and temporarily bind with the negatively charged plating agent receptor, e.g., indium tin oxide, of the electrode layer 14 to produce a generally black colored visible change in the electrode layer under the influence of the applied EMF. Simultaneously, the negatively charged chloride ions of the bismuth chloride plating agent are drawn to and temporarily bind with the positively charged counter electrode layer 18 (described in greater detail hereinafter).

Upon removal or reversal of the EMF the positively charged bismuth ions are released from the electrode layer plating agent receptor substance of electrode 14, the negatively charged chloride ions are released from the counter electrode 18 and bismuth chloride reforms and equilibrates in the electrolyte 16. To facilitate and expedite this process, the electrolyte 16 optionally, and preferably, further comprises a "scrubbing agent." The scrubbing agent should comprise a suitable substance, such as a salt compound, whose positive ions have a greater chemical affinity for the negatively charged plating agent receptor of electrochromic layer 14 than the positive ions of the aforementioned plating agent when cell 10 is in an equilibrium state, i.e., when no EMF is being applied or when the polarity of the applied EMF is opposite to that applied when the desired electrochromic reaction is to take place. Simply stated, positively charged ions of the scrubbing agent naturally displace the positively charged ions of the plating agent at the bonding sites of the plating agent receptor of electrode layer 14 when cell 10 is in equilibrium.

An example of a scrubbing agent having beneficial use in the electrolyte 16 is copper (II) chloride, although other substances demonstrating the aforementioned scrubbing behavior may also be employed.

A presently preferred embodiment of electrolyte 16 is formulated as a two-part electrolyte composition, each part of which has independent utility as a printable electrolytic ink. However, when combined in the manner described in FIG. 10, the parts coalesce into a unitary mass having exceptional electrolytic and structural integrity characteristics.

A first part of electrolyte composition 16, hereinafter referred to as "Electrolyte A", rapidly dries to the touch into an essentially non-tacky state. Electrolyte A is therefore well suited to subsequent processing in a high speed press. In a rotogravure press, for example, Electrolyte A is capable of readily receiving additional layers of inks, including both functional and decorative inks without experiencing damage to itself, without interfering with or inhibiting placement of later applied inks, and without fouling of downstream print stations with Electrolyte A.

By contrast, a second part of electrolyte 16, hereinafter referred to as "Electrolyte B", retains a higher moisture content than Electrolyte A and remains somewhat tacky upon deposition on a substrate. As a result, Electrolyte B simultaneously serves as a source of moisture for and promotes a strong mechanical connection and electrochemical interaction with Electrolyte A when the two electrolyte layers come into contact with each other and, in addition, when the two electrolyte layers come in contact with electrode layer 14. In addition, because of its tackiness, however Electrolyte B is preferably applied as the final ink layer in a typical multi-station printing pass of a substrate film, sheet or web.

When embodied as printable inks, each of Electrolytes A and B desirably comprise the aforesaid plating agents and humectants in the following proportions in weight percent (wt %):

from about 0.2 to about 1.0 wt %, more preferably about 0.6 wt %, plating agent; and from about 4 to about 10 wt %, more preferably about 7 wt %, humectant.

Both Electrolyte A and Electrolyte B should be applied with essentially uniform consistency and predictable thickness and in virtually any desirable pattern on any flexible or rigid substrate that is capable of functioning as a printable surface. In extensive research and development which culminated in the present invention, the present inventors have discovered that certain quantities and combinations of solvents and binding agents, when selectively coupled with the plating agents and humectants described above, produce electrolytic ink materials having favorable electrochemical properties and, generally, the desirable physical characteristics of either Electrolyte A or Electrolyte B.

Electrolyte A, a rapid drying, essentially non-tacky electrolytic ink therefore preferably further comprises:

from about 10 to about 60 wt %, more preferably about 40 wt %, of a suitable organic solvent including, without limitation, an alcohol such as ethyl, isopropyl, normal propyl or methyl alcohol; or acetate such as ethyl, isopropyl, normal propyl or methyl acetate; alcohol and acetate blends, a presently preferred blend being an 80/20 ethyl alcohol/normal propyl acetate blend; ketones; toluene, and the like; and from about 2 to about 30 wt %, more preferably about 8 wt %, of polyvinyl butyral, polyvinyl chloride, acrylic, nitrocellulose, and copolymers of vinyl chloride, e.g., ethyl acrylic acid (EAA)/vinyl chloride, as a binding agent.

And, Electrolyte B, a tacky electrolytic ink preferably further comprises:

from about 15 to about 50 wt %, more preferably about 35 wt %, of water, alcohol (e.g., ethyl, isopropyl, normal propyl, methyl or butyl alcohol) or an aqueous alcohol solution (a presently preferred solution being an 80/20 water/isopropyl alcohol solution) as a solvent; and from about 2 to about 30 wt %, preferably about 22 wt %, of either polysaccharide, nitrocellulose, hydroxyethyl cellulose, acrylic, vinyl, or a copolymer of vinyl chloride as a binding agent.

If desired, the electrolyte composition may also contain one or more pigments to achieve at least one desired visual effect in the electrochromic cell 10 before, during and/or after occurrence of the intended electrochromic reaction.

The aforementioned essential and optional constituents of electrolyte layer 16 and electrode layer 14 may be combined by any suitable processes. For instance, they may be combined in the quantities mentioned in batch or continuous processes at normal atmospheric pressure and temperature conditions.

As previously mentioned, counter electrode 18 is negatively charged and therefore functions as an anodic electrode in cell 10. Counter electrode 18 may comprise any material of sufficient electrical conductivity to promote the desired electrochemical reaction of cell 10, and which is suitable for adhesion to electrolyte layer 16 and, preferably, any other layers of cell 10 with which counter electrode 18 will be in contact. The thickness of counter electrode 18 may be between about 0.05 mil and about 5 mil, and is preferably about 0.3 mil to 0.5 mil.

Inks usable as counter electrode 18 include carbon based, silver based, nickel based and other suitable conductive material based inks. A carbon based ink suitable for use in the present invention is stock number SS24600 manufactured by Acheson Colloids Company of Port Huron, Mich. The preferred thickness of this formulation of carbon based ink when applied as counter electrode layer 18 is between about 0.1 and 1.0 mil, and is preferably about 0.4 mil.

Figure 2:
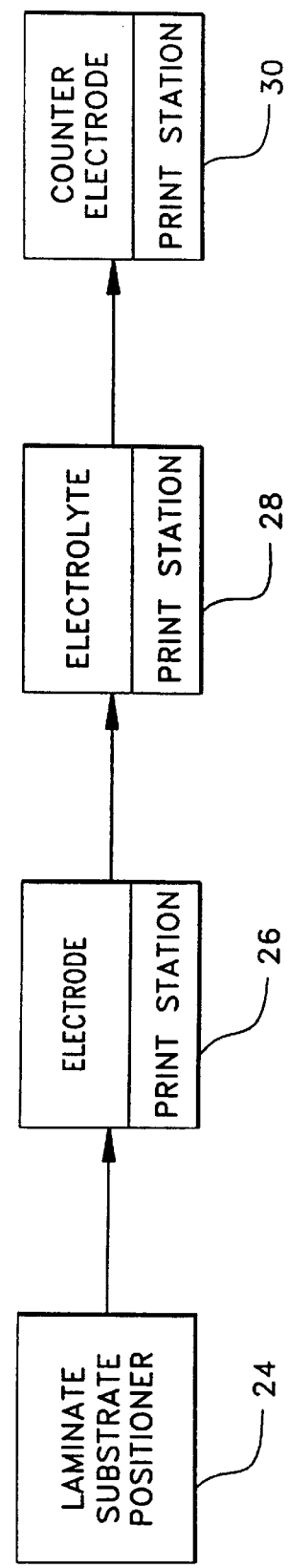
FIG. 2 is a schematic view of an apparatus and method for assembling the electrochromic cell of FIG. 1.

FIG. 2 depicts, in schematic form, a simplified apparatus and method for assembling the essential components of the electrochromic cell 10 of FIG. 1. Substrate 12 is positioned by a laminate substrate positioner 24 in a first print station 26 where an electrode layer 14 is applied to substrate 12. Substrate 12 is then positioned by positioner 24 in a second print station 28 wherein a layer of electrolyte material 16, which may correspond generally to Electrolyte A described above, is applied to electrode layer 14. Finally, substrate 12 is positioned by positioner 24 in a third print station 30 where counter electrode layer 18 is applied to electrolyte layer 16.

Positioner 24 may comprise any device, such as an mechanized unwind station or any manual interaction required to position substrate 12 in print stations 26, 28 and 30. Print stations 26, 28 and 30 may comprise individual printing apparatus or, in the alternative, discrete printing stations of a single multi-station printing apparatus. Any conventional printing apparatus or method including, without limitation, sputtering, flexographic printing screen printing or gravure printing apparatus may be suitable for applying to substrate 12, electrode 14, electrolyte 16 and counter electrode 18 as formulated herein in order to assemble cell 10. A presently preferred printing device is a rotogravure printing apparatus. Preferably, therefore, positioner 24 and print stations 26, 28 and 30 are integrated in a rotogravure printing press which usually comprises a series of rotogravure print stations.

Optionally, terminals 20 and 22 may be placed in electrical communication with electrode layer 14 and counter electrode layer 18, respectively, as an added step of the process of this invention. Terminals 20 and 22 may be comprised of any conductive material. Preferably, terminals 20 and 22 are comprised of an electrically conductive ink, such as silver, copper or the like, thus allowing terminals 20 and 22 to be printed by means similar to that of the other layers of cell 10.

In the embodiment of this invention set forth in FIGS. 1 and 2, terminal 20 may be printed prior to, simultaneously with, or after the printing of electrode layer 14. Likewise, terminal 22 may be printed prior to, simultaneously with, or after the printing of counter electrode 18.

Additional print stations may also be added to the embodiment of the invention shown in FIG. 2 for the purpose of printing terminals 20 and 22. For example, a print station for printing terminal 20 may be added immediately preceding or succeeding print station 26. Alternatively, print station 26 may be modified to substantially simultaneously print both electrode layer 14 and terminal 20. Similarly, an additional print station may also be added immediately preceding or succeeding print station 30 for printing terminal 22. Alternatively, print station 30 may be modified to substantially simultaneously print both counter electrode layer 18 and terminal 22.

As a further option, and prior to printing on substrate 12, it is generally preferable to corona treat substrate 12 to raise the surface tension or "dyne" level of substrate 12, thereby enhancing the adhesion of the printing inks to substrate 12. As is known, corona treatment imparts a high voltage, low current, electrical charge to the surface of substrate 12. Similar results may likewise be achieved using plasma treatments and/or other electrical, mechanical and chemical surface tension enhancement treatments known in the art.

If the dyne level of substrate 12 is too low, printing inks will tend to adhere in a non-uniform manner and possibly form ink beads of non-uniform thickness on the surface of substrate 12. However, if the dyne level of substrate 12 is raised, the inks will tend to adhere more uniformly and with consistent thickness over the surface of substrate 12.

It will be apparent from consideration of the remainder of this specification and the appended drawings and claims that each of the features of the invention described herein may be incorporated into any of the embodiments discussed. For example, the embodiment of the invention set forth in FIGS. 1 and 2 may also include additional print stations for printing decorative inks where desired. In particular, substrate 12, when presented in the form of a layer of substantially transparent PVC, provides an excellent indicia bearing surface. Accordingly, one or more decorative inks of various colors may be printed on substrate 12 prior to printing electrode layer 14. To the extent that both substrate 12 and electrode layer 14 are substantially transparent, decorative inks may be printed on electrode layer 14 so long as they do not interfere with the function of layer 14 within cell 10.

Moreover, a base substrate layer 34 (as in FIG. 3) may be applied to counter electrode layer 18. Substrate layer 34 may provide numerous advantages such as, for example, protection of the printed surfaces, provision of indicia bearing surfaces and/or provision of electrical insulation by preventing electrochromic cell 10 from shorting to ground. Base substrate 34 may be constructed from any of the materials from which substrate 12 is constructed including, but not limited to, PVC film of between about 0.4 to about 4 mil in thickness.

In addition, each printed layer of cell 10 may be printed over the entire preceding layer or may be printed only on select portions of the preceding layer. The shape of each printed layer is generally referred to as "artwork" and is dictated by the shape and volume of the image carriers etched into the print cylinders. Where the artwork of the various layers would cause the electrochromic cell 10 to short (i.e., where electrode layer 14 comes into direct contact with counter electrode layer 18 thereby electrically bypassing electrolyte 16), a layer of insulation, such as dielectric ink, may be printed in the location at which electrode layer 14 and counter electrode layer 18 would otherwise be in electrical contact.

In at least one embodiment of this invention (FIG. 3), a dielectric layer 38 may be provided protect terminals 20 and 22 against the corrosive effects of electrolyte 16. In the construction of cell 10, electrolyte 16 is acidic and tends to leach through and destroy the other component layers of cell 10. Accordingly, if properly located, a dielectric layer will substantially inhibit destruction of cell 10 by electrolyte 16. Moreover, if properly positioned, the dielectric may also prevent terminals 20 and 22 from shorting out to counter electrode 18.

Where a dielectric ink is utilized as an insulation layer, single or multiple layers of dielectric ink having a total thickness of between about 0.3 and 0.4 mil are preferred to achieve suitable insulation. For example, two dielectric layers, each of between about 0.15 and 0.20 mil may be applied to cell 10. Depending on aesthetic and functional considerations, dielectric inks may also be provided in a variety of colors.

Moreover, in some instances, graphic or other suitable inks may be used as insulation between layers of cell 10. Such insulation layers may not only provide electrical insulation between layers, but also may prevent adverse chemical reactions from occurring between chemically reactive layers. For example, if the base substrate 34 comprises a metallized layer and the counter electrode 18 comprises a carbon based ink, a layer of graphic ink may be applied between the base substrate and counter electrode layer. Applying such insulation serves to inhibit potentially destructive chemical reactions between counter electrode 18 and the metallized layer of substrate 34.

It should further be noted that each of the layers comprising cell 10 may also be provided in a variety of colors to suit the functional and aesthetic requirements of any device comprising cell 10.

A suitable bonding material such as pressure sensitive adhesive may also be applied to any layer of cell 10 such as counter electrode 18 for the purpose of affixing, either permanently or temporarily, cell 10 to a flexible or rigid surface external to cell 10. The bonding layer may be applied by a printing station on a rotogravure press or other suitable printing apparatus. The bonding material may be applied over the entire surface of the relevant layer(s) of cell 10 or, alternatively, in a predetermined pattern so as to avoid both interference with the electrical communication between the functional components of cell 10 and obscuring of any graphics present on or in the cell.

In the embodiment of the invention depicted in FIGS. 1 and 2, the bonding material may be applied, for example, to the outer surface of counter electrode layer 18 either at print station 30 or at a separate print station. Where a pressure sensitive adhesive is employed, a suitable release paper is desirably applied over the adhesive after application of the adhesive to, for example, counter electrode 18. So constructed, cell 10 effectively serves as a pressure sensitive adhesive label. Due to the thin film characteristics of the resultant label, cell 10 may thus be applied to virtually any suitable surface such as, for example, signage, graphics displays, merchandising displays, wristwatches and dry cell batteries, among others.

Because they are well suited high speed printing applications where cell 10 may be rapidly produced in large quantities, rotogravure printing apparatus and processes are especially preferred in practicing the present invention, particularly when cell 10 includes a flexible substrate layer 12. And, because each layer of cell 10 may be printed on webs or sheets of substrate 12 (which webs may range in width from between about several inches to several feet), numerous cells may be simultaneously printed depending on the particular dimensions of cell 10. The printing cylinders contained in each print station may also be engraved to accommodate simultaneous printing of multiple cells 10 per rotation of each of the printing cylinders. The number of cells printed per rotation will largely depend upon the dimensions of both the cells 10 and the individual printing cylinders. Web speeds in excess of 100 feet per minute have been achieved in producing multiple cells 10 on a substrate web of approximately 20 inches in width and with print cylinders of approximately 7 inches in diameter and 24 inches in length by the apparatus and process of this invention.

When multiple cells 10 are produced on a substrate web 12, the surface of the web opposite the printed cells 10 is preferably coated with a pressure sensitive adhesive and then covered by suitable release paper. The web containing the assembled cells 10 may then be easily separated into individual cells 10 by die cutting techniques. Hence, the release paper functions as a flexible support and storage medium for the assembled cells. When so disposed, the cells may conveniently remain on the release paper for later manual or automatic removal and use such as, for example, by automated labeling equipment. Waste material or matrix between each printed cell 10 may be stripped away and disposed of and the cells 10, being supported by a web of release paper, may then be rewound at a rewind station onto a spool or roll for inspection, editing, packaging and shipping of the completed roll.

It is also contemplated that various components of electrochromic cell 10 may be inspected as cell 10 is assembled as well as after cell 10 is completely assembled. Such inspection may be manually and/or automatically conducted either during the assembly process and/or after cell 10 is completed. On-line or off-line inspection methods and techniques may be employed.

Such inspection methods and techniques may utilize optical or other automated inspection systems known in the art. Optical vision systems may be utilized at each print and/or assembly station, at select print and/or assembly stations, and at any other point during or after the assembly of cell 10. Any perceptible characteristic of any component of cell 10 may be inspected such as, for example, the longitudinal and/or lateral registration of each printed layer, the longitudinal and/or lateral registration between each cell 10 as multiple cells 10 are printed on a continuous substrate web, the thicknesses of each layer, (whether printed or prefabricated), the color of each layer, and the clarity of printing of each layer.

The electrical properties of the various components of electrochromic cell 10 may also be tested by either on-line or off-line testing procedures. For example, the overall resistance or voltage draw of any of the layers of the electrochromic cell 10 such as electrode layer 14, electrolyte layer 16, counter electrode layer 18, terminals 20 and 22 and/or other components may be tested during the assembly process. Each component may be tested individually and/or cumulatively during assembly and the results compared against known tolerance ranges.

If such testing indicates that any component or series of components are outside acceptable tolerances, a signal indicating that adjustment is necessary may be sent to an operator of the press for manual adjustment of the press. Alternatively, the indicating signal may be automatically fed back to a computerized press control system for automatic adjustment to correct the problem. The press may also be manually or automatically shut down should any component or series of components fall outside of acceptable tolerances. Of course, all such testing may also be conducted by off-line procedures.

Figure 3:
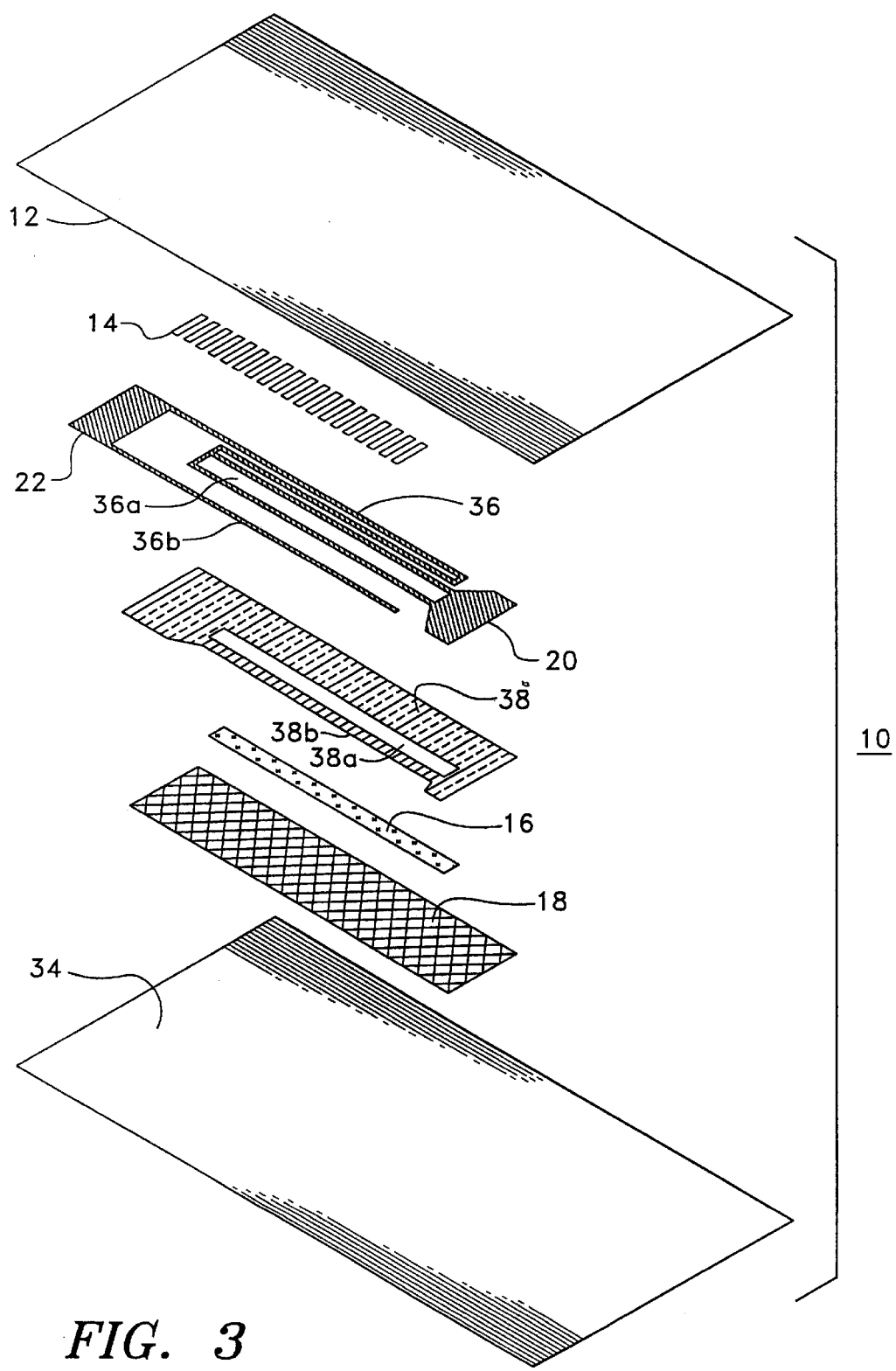
FIG. 3 is an exploded view of the layers of another embodiment of an electrochromic cell arranged in accordance with the present invention.

FIG. 3 illustrates an exploded view of yet another embodiment of the layers of cell 10 produced according to yet another embodiment of this invention. Cell 10 may be used to indicate the relative voltage drop across terminals 20 and 22. FIG. 3 further illustrates how various forms of printed artwork may be employed by the process of this invention.

The embodiment of cell 10 depicted in FIG. 3 may be utilized in any application in which a quantitative indication of the relative voltage drop across terminals 20 and 22 is desired. For example, the state of charge of an EMF 32 (FIG. 1) such as a dry cell battery may be detected where the electrodes of EMF 32 are in contact with terminals 20 and 22.

When an EMF 32 source, such as a dry cell battery, is connected across terminals 20 and 22, electrode layer 14, which is in the form of individual segments positioned across voltage divider 36, undergo an electrochemical reaction in the form of a change in color. With the artwork configuration of FIG. 3, the number of segments of electrode layer 14 which change color is proportional to the voltage present across terminals 20 and 22. In other words, the more segments of electrode layer 14 which change color, the higher the voltage present across terminals 20 and 22. Thus, higher voltage and number of segments 14 which change color translate, where a dry cell battery is being tested, into higher charge remaining in the battery.

Cell 10 of this embodiment comprises substrate 12 upon which layers of electrode material 14, voltage divider 36, comprising both terminals 20 and 22, and insulting dielectric material 38 are printed. Preferably, substrate 12 comprises a PVC film, electrode layer 14 comprises an ITO ink, voltage divider 36 comprises a conventional silver ink and insulating layer 38 comprises a dielectric ink.

Optionally, base substrate 34 may also be included in the embodiment of cell 10. Substrate 34 may comprise any of the materials described above in connection with the previous embodiment. However, in this embodiment, substrate 34 preferably comprises at least one PVC layer and may also additionally comprise layers of graphic inks and/or vacuum deposited metallized layers such as aluminum.

In one embodiment, substrate 34 may comprise a layer of aluminum vacuum deposited on a layer of shrinkable PVC film and a layer of non-shrinkable PVC film adhesively affixed to the aluminum layer. A layer of pressure sensitive adhesive may be applied to the surface of the shrinkable PVC opposite that of the vacuum deposited aluminum. The pressure sensitive adhesive allows bonding of cell 10 to any desired surface such as, for example, the surface of a sign display, a dry cell battery or wristwatch. Preferably, a layer of release paper may be added to cover the pressure sensitive adhesive.

Numerous other configurations of substrate 34 are possible depending on the particular application for which cell 10 is intended. For example, PVC may be substituted by any other thin film material suitable for passing through a rotogravure press. Such materials may include other plastic materials, papers, metal sheet, metal foils, composites and the like to which inks or other materials may be deposited.

Turning now to the specific characteristics of the printed layers of cell 10 depicted in FIG. 3, electrode 14, electrolyte 16, counter electrode 18, dielectric 38 all may comprise the materials of cell 10 substantially at the thicknesses set forth above.

Voltage divider 36 may comprise the same or similar materials as terminals 20 and 22 set forth above. In its preferred embodiment, voltage divider 36 comprises a layer of conventional silver ink which provides good conductivity and does not promote corrosion. The thickness of voltage divider 36 is preferably between about 0.25 and 0.50 mil. The voltage divider 36 of this embodiment is configured to form two resistors (preferably one fixed and one variable) in series with electrode layer 14 and counter electrode layer 18. Desirably, the configuration of voltage divider 36 is selected so as to not visually obscure the electrochemical reaction in electrode material 14.

As has been mentioned hereinabove, for proper functioning of any electrochromic cell the electrolyte component thereof must not only be capable of promoting a desired electrochemical reaction between itself and the cathodic and anodic electrodes but it must also prevent shorting between the electrodes. The latter requirement is especially significant in applications where the electrochromic cell 10 according to the present invention is fabricated using one or more flexible substrates such as layers 12 and 34, and particularly when the electrolyte layer 16 is substantially viscoelastic throughout its service life, as it is according to at least one preferred embodiment of the invention. Consequently, the generally gelatinous and viscoelastic electrolyte layer 16 could become subject to substantial localized compressive forces during manufacture, shipping, handling and usage which might cause the electrolyte layer to compress to a point whereby electrode layer 14 comes into contact with counter electrode layer 18 thereby causing electrochromic cell 10 to short circuit and perhaps suffer irreversible damage.

The present invention therefore also contemplates means 100 for resisting compression of the electrolyte layer 16. According to the invention, as shown in FIGS. 4 through 7, such means may be separate from and/or integral with the electrolyte layer.

Figure 4:
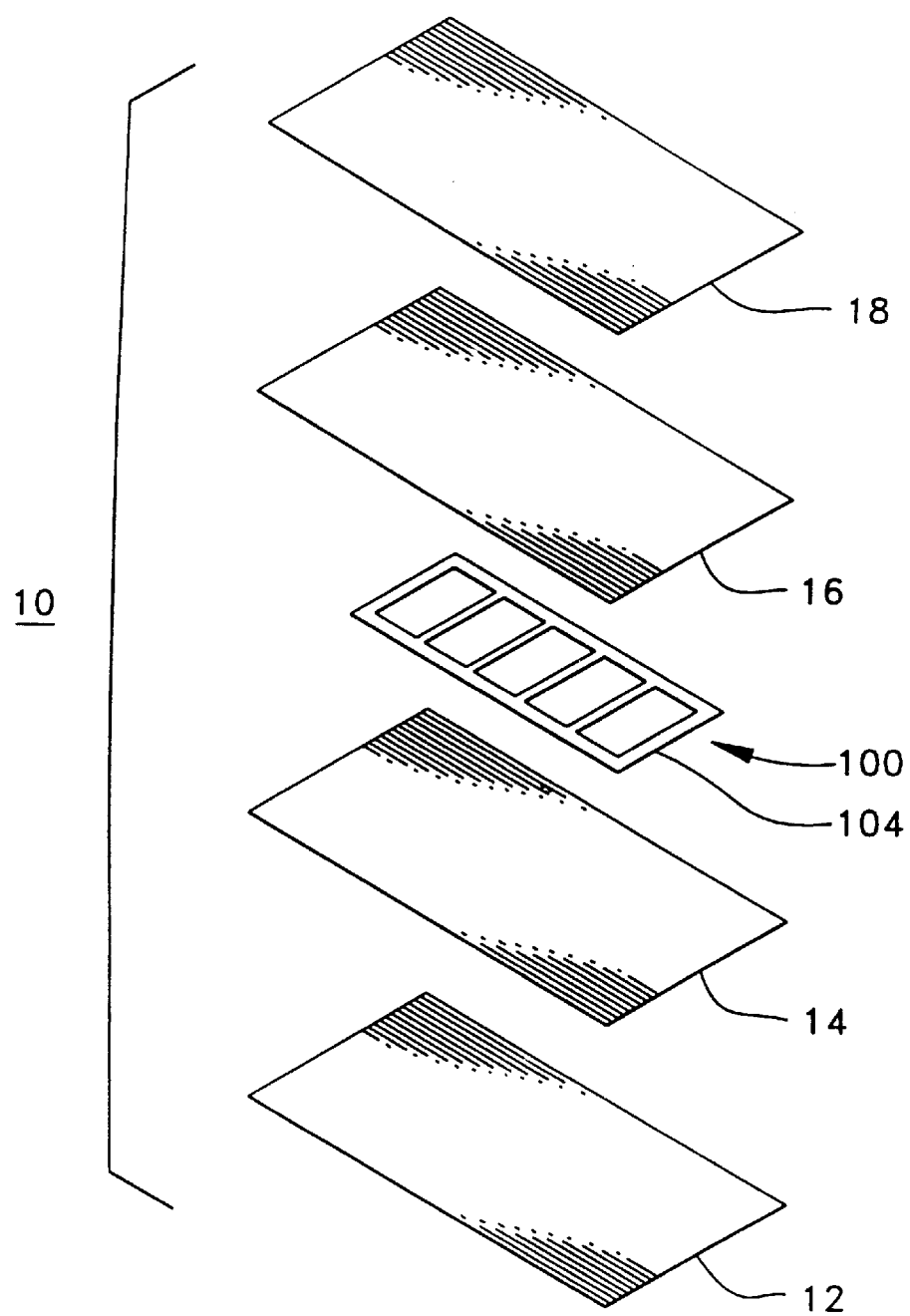
FIG. 4 is an exploded view of the layers of another embodiment of an electrochromic cell arranged in accordance with the present invention.
Figure 5:
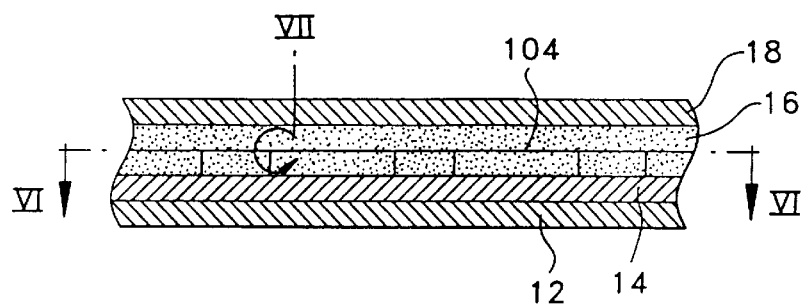
FIG. 5 is an elevational, cross-section view of the electrochromic cell of FIG. 4 in assembled condition.

Turning initially to FIGS. 4 and 5, electrochromic cell 10 comprises a substrate 12, electrode layer 14, electrolyte layer 16, and counter electrode layer 18 having compositions and thicknesses consistent with their counterparts previously discussed in connection with FIGS. 1 and 3. As such, the details of these components will not be described in further detail herein except where their characteristic features materially depart in structure, composition and/or function from their aforementioned counterparts or where it is otherwise necessary for a proper understanding of the invention.

Figure 7:
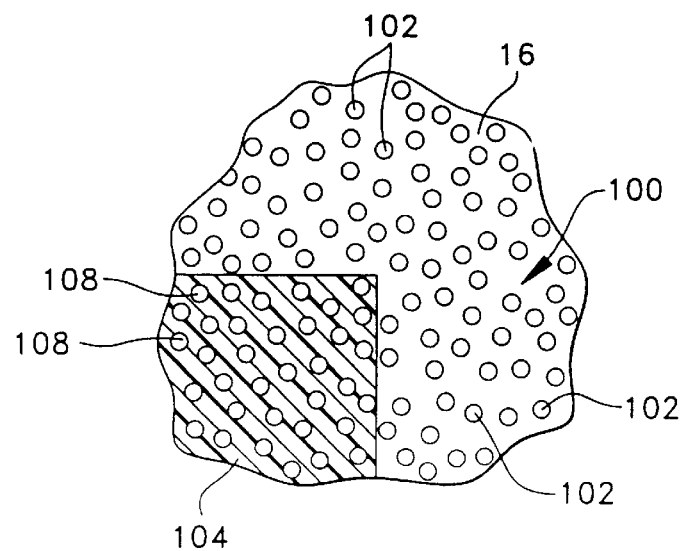
FIG. 7 is an enlarged cross-sectional view of the area encircled within arrow VII of FIG. 5.

As is perhaps most clearly seen in FIG. 7, in its simplest form the means 100 for resisting compression of the electrolyte layer 16 may comprise means incorporated in the mass of electrolyte material itself for enhancing the structural strength of the electrolyte layer by reducing its ability to flow and compress under the influence of externally applied forces. Such means may comprise any suitable force distributing material, for example, fibrous and/or particulate material. An especially preferred material is a plurality of miniaturized substantially spherical particles referred to simply herein as "spheres" 102 which may be used alone (as illustrated) or in combination with other particulate and/or fibrous material that may be combined and deposited with the electrolyte material 16. The spheres 102 may be solid or hollow (as illustrated). They may be fabricated from any substantially rigid material such as glass or plastic that can be formed into extremely small spheres of less than about 50 $\mu$m in diameter, more preferably less than about 20 $\mu$m, and still more preferably less than about 10 $\mu$m, by processes known in the art. Suitable spheres for purposes of the present invention include hollow glass spheres manufactured by Potter Industries, Inc. of Parsippany, N.J. The spheres 102 are preferably combined and mixed with the electrolyte material 16 formulated according to the present invention (e.g., either or both of Electrolyte A and Electrolyte B discussed above) prior to deposition to ensure substantial uniform distribution of the spheres throughout the electrolyte matrix material upon deposition thereof.

Because of their substantially spherical shape, which shape inherently possesses exceptional force distribution and transmission characteristics, the spheres 102 provide an excellent means for resisting the impacts and other mechanical shock that may be encountered by cell 10 under normal manufacturing, shipping, handling and usage of the cell. And, because their generally smooth and rounded exterior enables the viscoelastic electrolyte material to envelop the spheres 102 in an essentially continuous matrix, the spheres pose no material obstacle to migration of the plating agent ions (or scrubbing agent ions) during operation of the cell 10.

Alternatively or in addition to compression resistant means incorporated in electrolyte layer 16, the means 100 for resisting compression of the electrolyte layer may also comprise at least one layer of compressive force resistant material 104 disposed between the electrolyte layer 16 and either or both the electrode layer 14 and the counter electrode layer 18. For simplicity of illustration and discussion, only one such layer 104, shown disposed between the electrode layer 14 and electrolyte 16 in FIGS. 4–7, is described in detail. It will be understood that such description is likewise applicable to any layer of compressive force resistant material that may be disposed between the electrolyte layer 16 and the counter electrode layer 18, or between the electrolyte layer and any layers interposed between it and the electrode and/or counter electrode layer(s).

According to a presently preferred embodiment, layer 104 preferably comprises at least one layer of coating material such as printable and curable dielectric ink which may be applied to electrode layer 14 prior to electrolyte layer 16 by any of the aforementioned printing apparatus or methods. Alternatively, layer 104 may be preformed and thereafter applied to electrode layer 14 in advance of electrolyte layer 16. The preferred thickness of layer 104 is from about 0.5 to 1.0 mil in order to minimize the cross-sectional profile of the cell 10 without compromising the force resistance characteristics of layer 104.

Layer 104 may configured as a continuous, regularly shaped (e.g., solid rectangular) arrangement. Preferably, however, the layer 104 defines a discontinuous arrangement. The term "discontinuous" when used to describe layer 104 merely means that the layer 104 defines a practical measure of open space within its areal boundaries. Such open space permits flow of the electrode layer 16 into such open space so that the electrolyte material 16 sufficiently contacts the electrochromic layer 14 upon assembly of cell 10.

Figure 6:
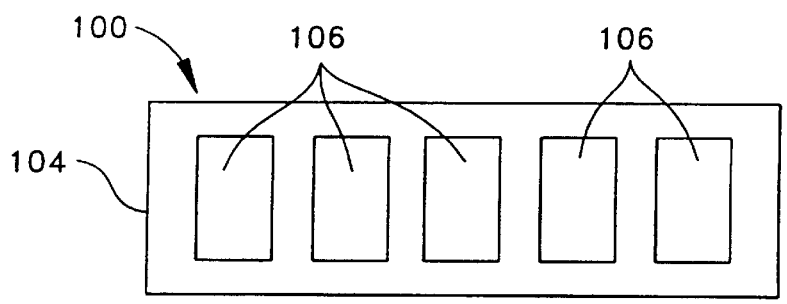
FIG. 6 is a view taken along line VI—VI of FIG. 5.

The discontinuous arrangement of layer 104 may be a random or amorphous shape. Preferably, however, the discontinuous arrangement defines an identifiable pattern, an illustrative but non-limitative example of which is depicted in FIG. 6. In that figure, the pattern established by the discontinuous arrangement is generally rectangular configuration interrupted by one or more pockets 106. Pockets 106 may be any polygonal or curvilinear shape and can be of uniform or non-uniform sizes. The pattern for defining the pockets 106 does not necessarily have to produce one or more pockets of closed-cell configuration. That is, the discontinuous arrangement may be simply a plurality of substantially parallel rows of material, which rows may be straight, curved, sinusoidal, sawtoothed or otherwise defining or identifiable pattern providing open space through which electrolyte 16 may flow to contact electrode layer 14.

Moreover, to further enhance the structural strength of layer 104, such layer may also include supplemental compressive strength enhancing material such as fibrous material, particulate material or a plurality of spheres 108 (FIG. 7) similar in size, shape and function to the spheres 102 that may also be incorporated in electrolyte material 16, or any combination of such materials.

Figure 8:
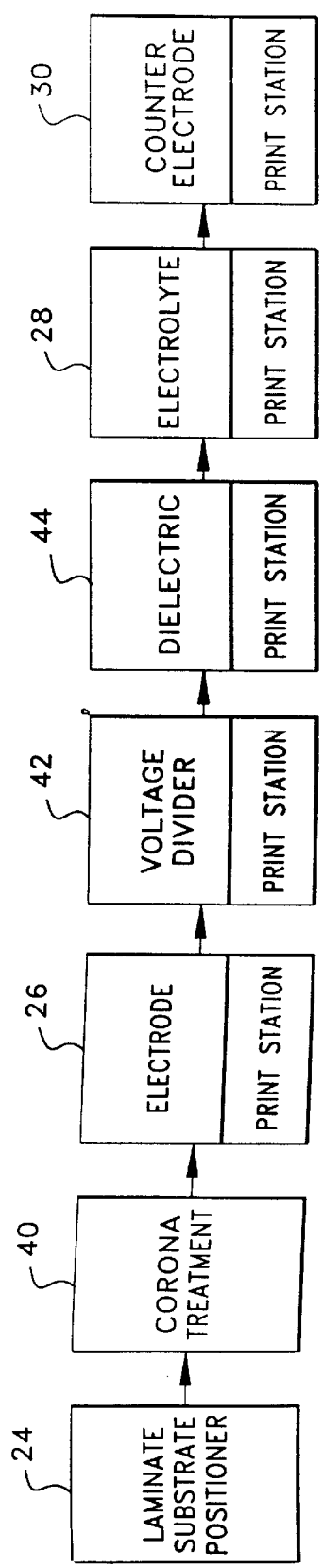
FIG. 8 is a schematic view of another embodiment of the apparatus and method for assembling an electrochromic cell constructed according to the present invention.

FIG. 8 depicts, in schematic form, an apparatus and method for assembling electrochromic cell 10 of FIG. 3. It will be understood that similar apparatus and methods may be used to assemble the other electrochromic cells 10 described herein and similar such cells that may be constructed pursuant to the teachings of the present invention. The preferred method of assembly and application of the various layers on substrate 12 is by printing. And, when printing is employed to assemble cell 10, most preferably, the printing process is carried out on a rotogravure press.

Initially, substrate 12 is desirably positioned by positioner 24 in corona treatment station 40 where the dyne level of substrate 12 is increased. Although corona treatment is a preferred step in the process of this invention, it is not required to produce a functional cell 10.

Substrate 12 is then positioned by positioner 24 in at least one electrode print station 26 wherein electrode layer 14 is applied to substrate 12. Substrate 12 is next positioned by positioner 24 in at least one voltage divider print station 42, wherein voltage divider 36 is applied so as to be in electrical communication with electrode layer 14 and wherein cell 10 will operate as described above. Suitable openings 36a and 38a are provided in voltage divider 36 and dielectric 38 to allow electrolyte layer 16 to be in communication with electrode segments 14.

Voltage divider 36 desirably contacts electrode segments 14 on each end of each segment so as to cause the segment 14 closest to negative terminal 20 to change color first during the electrochemical reaction. Each successive segment 14 next closest to positive terminal 22 will also change color in a sequential manner until a steady state is reached in the electrochemical reaction. With this configuration, an increased number of segments 14 will change color with an increase in the voltage drop across terminals 20 and 22. Conversely, as the voltage drop approaches zero, few or no segments 14 will change color.

The electrochromic cell construction thus depicted in FIG. 3 may be considered a device by which an EMF voltage may be quantitatively determined. By contrast, lacking a designated voltage divider such as voltage divider 36, the embodiment of cell 10 shown in FIG. 1 (and similar cell constructions) may be conceptualized as capable of providing a qualitative measure of an applied EMF voltage. For instance, rather than a graduated type scale, electrode layer 14 may be printed so as to display a simple message such as "GOOD" or "REPLACE" when the applied EMF exceeds, or fails to exceed, a predetermined threshold value.

Substrate 12 is next positioned by positioner 24 in at least one dielectric print station 44, wherein dielectric 38 is applied so as to insulate electrochromic segments 14 and voltage divider 36 from electrically shorting to counter electrode layer 18. As noted above, an opening 38a is provided in dielectric 38 generally in alignment with opening 36a of voltage divider 36 to allow electrolyte layer 16 to be in electrical communication with electrochromic segments 14. A second opening or notch 38b is also provided in dielectric 38 to allow a branch 36b of voltage divider 36 to be in electrical communication with counter electrode 18 without shorting out counter electrode 18 with electrode segments 14.

Substrate 12 is next positioned by positioner 24 in at least one electrolyte print station 28, wherein at least one electrolyte layer 16 is applied to electrode segments 14, by virtue of aligned openings 36a and 38a, without contacting voltage divider layer 36. Finally, substrate 12 is positioned by positioner 24 in at least one counter electrode print station 30, wherein counter electrode layer 18 is applied so as to be in electrical communication with electrolyte layer 16 and voltage divider 36 without shorting out to electrochromic segments 14.

Figure 9:
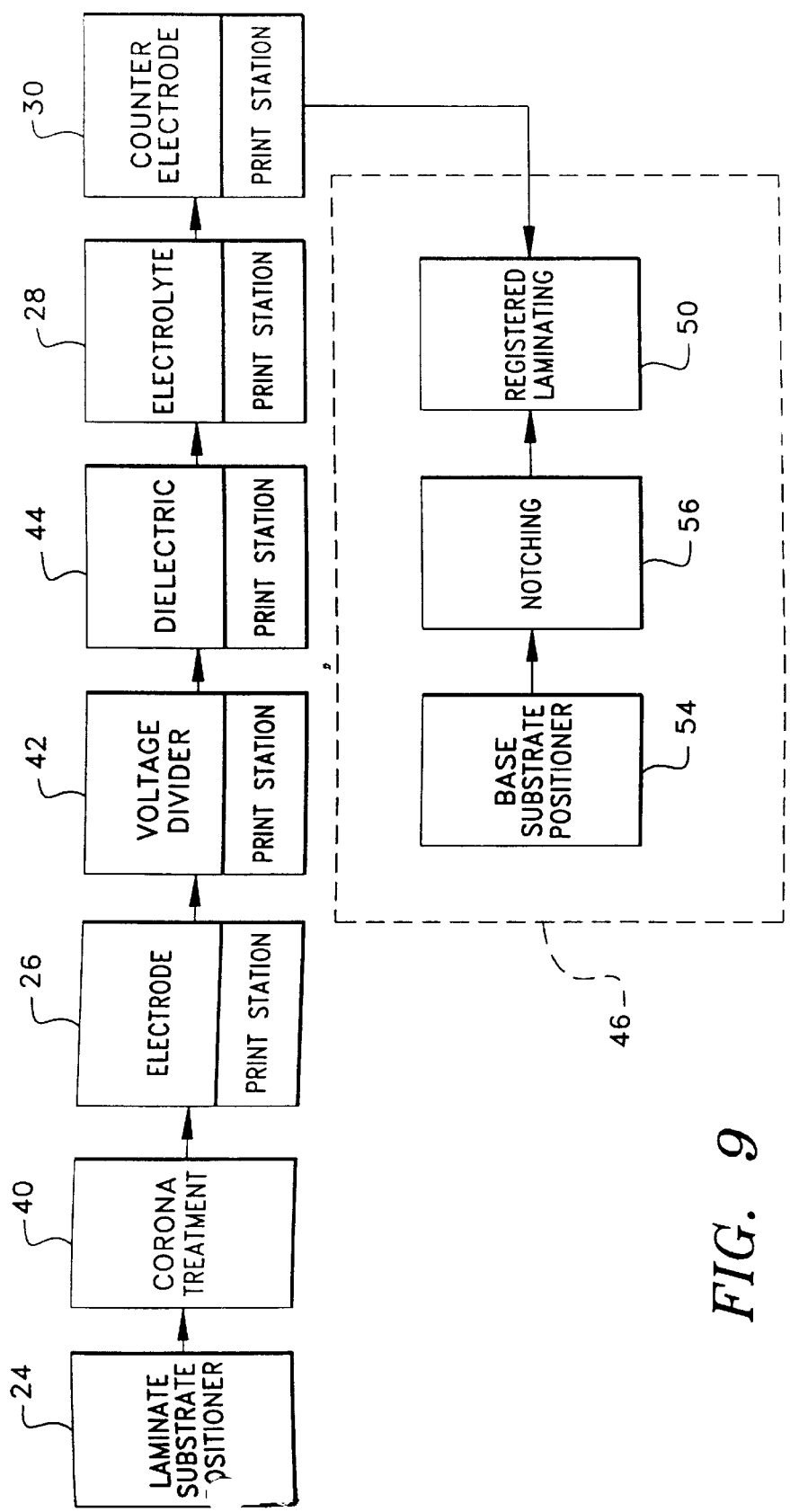
FIG. 9 is schematic view of an apparatus and method for assembling the electrochromic cell of FIG. 3.

Optionally, substrate 12 may next be positioned in a base substrate layer applicator 46, depicted in FIG. 9, wherein base substrate 34 may be applied to cell 10, and preferably to counter electrode 18. In at least one embodiment of this invention, components 14, 36, 38, 16 and 18 are enveloped between laminate substrate 12 and base substrate 34 while passing through applicator 46. Substrate 34 may also be applied to cell 10 in applicator 46 by any means suitable to affix substrate 34 to cell 10 without interfering with the functional or aesthetic characteristics of cell 10. Such affixation techniques may include lamination, pressure sensitive adhesives and the like.

Base substrate applicator 46 may comprise any components capable of positioning and affixing base substrate 34 to cell 10. In FIG. 9, which substantially represents a press suitable for carrying out the objectives of the present invention (such as a rotogravure press), it is seen that base substrate applicator 46 may comprise a registered laminating means 50. Registered laminating means 50 is primarily concerned with aligning, registering and laminating base substrate 34 with printed laminate substrate 12.

Registered laminating means 50 may comprise any means for affixing base substrate 34 to cell 10 printed on laminate substrate 12. For example, adhesive, lamination, heat sealing or any other affixation means may be utilized, provided that the functional and aesthetic objectives of cell 10 are achieved.

Base substrate applicator 46 functions as follows: base substrate 34 is positioned in registered laminating means 50 by base substrate positioner 54. At means 50, base substrate 34 is aligned, and if necessary, brought into registration with printed cell 10 as substrate 12 exits from counter electrode print station 30. Base substrate 34 is then affixed to printed cell 10.

Several additional processes may be optionally performed on base substrate 34 between base substrate positioner 54 and registered laminating means 50. For example, base substrate 34 may be corona treated by means similar to that used in the corona treatment of laminate substrate 12. Openings in substrate 34 may also be die cut or notched at notching means 56 to create, for example, a switching mechanism to activate cell 10. In addition, on-line or off-line rewinding of completed cells 10, as well as inspection, packaging and shipping functions may also be added to the process and apparatus of the embodiment of FIG. 9.

Figure 10:
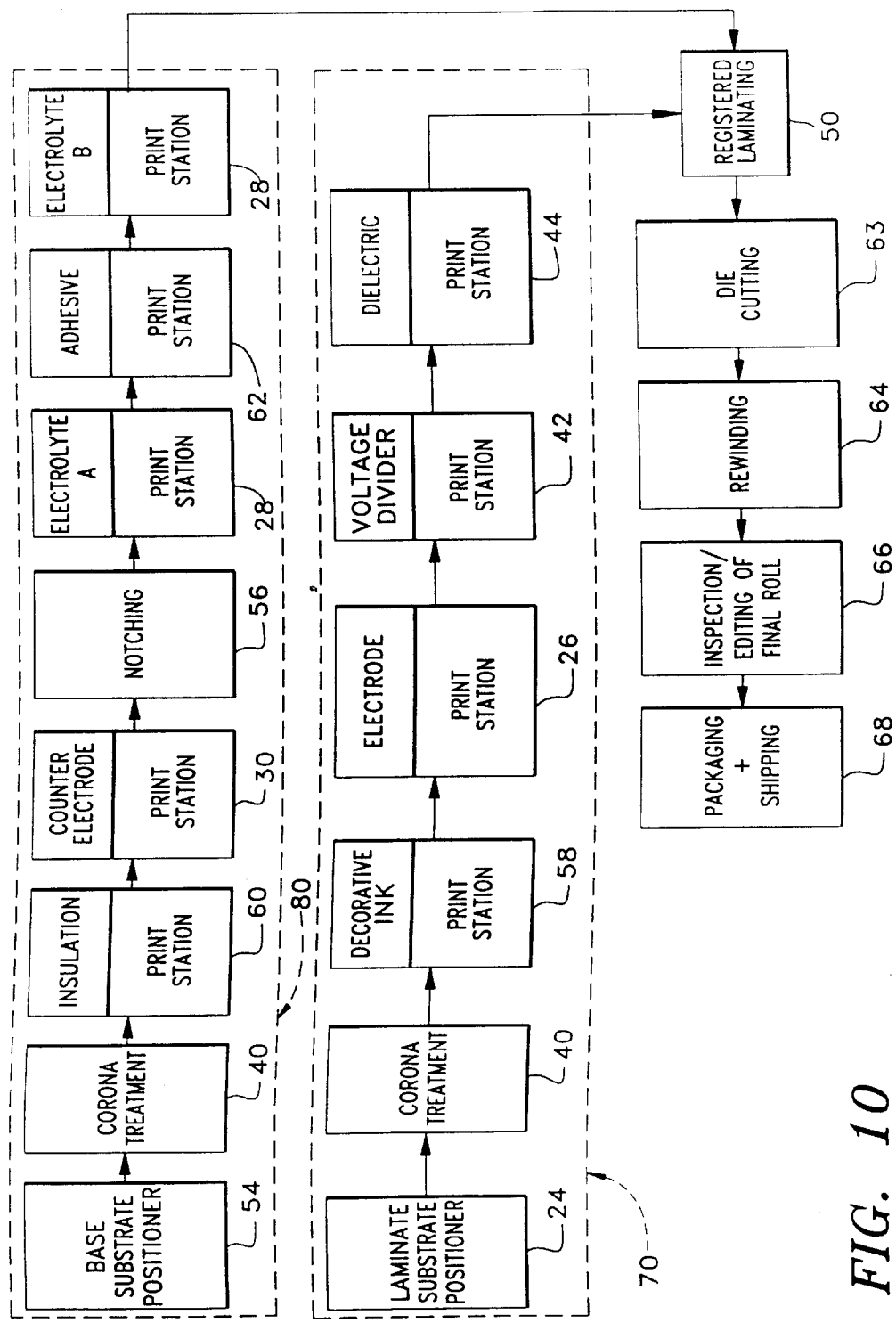
FIG. 10 is a schematic view of a two pass apparatus and method for assembling an electrochromic cell constructed according to the present invention.

FIG. 10 depicts a two pass embodiment of this invention. This embodiment may produce cells 10 for any suitable purpose but, preferably, this configuration may be used to construct labels for dry cell batteries comprising cells 10 which, when cell 10 is activated, indicates the state of charge of the battery.

The first pass of the embodiment revealed FIG. 10 is schematically depicted as area 70. The "first pass" is that processing pass in which substrate 12 undergoes treatment. The processing means by which first pass 70 is constructed generally comprises laminate substrate positioner 24, corona treatment station 40, optional decorative ink station(s) 58, at least one electrode print station 26, at least one voltage divider print station 42 and at least one dielectric print station 44.

The second pass of the embodiment disclosed in FIG. 10 is schematically depicted as area 80. The "second pass" is that processing pass in which substrate 34 undergoes treatment. The processing means by which second pass 80 is constructed generally comprises base substrate positioner 54, corona treatment station 40, at least one insulation ink print station 60, at least one counter electrode print station 30, notching station 56, at least one electrolyte print station 28 for printing, for example, Electrolyte A as described above. Optionally, a laminating adhesive print station 62 may be provided which, in turn, may be followed by at least one electrolyte print station 28 for printing, for example, Electrolyte B as described above.

In order to unite the first and second passes 70 and 80, first pass 70 is fed into registered laminating means 50 to be aligned, registered and laminated with second pass 80. Passes 70 and 80 are bonded together as one composite structure at means 50. The composite structure comprising passes 70 and 80 is preferably additionally processed in die cutting station 63, rewinding station 64, inspection and editing station 66 and packaging and shipping station 68.

First and second passes 70 and 80 may be assembled in simultaneous or separate operations. When printed simultaneously, first and second passes 70 and 80 are printed on substantially parallel rotogravure or similar presses, wherein printed pass 70 is aligned and brought into precise registration with second pass 80 and becomes affixed as one composite structure at registered laminating means 50. Moreover, although not illustrated, it will be understood that in two or more pass constructions involving any combination of tacky and nontacky electrolytes such as Electrolytes A and B, one of the electrolytes, e.g., Electrolyte A, may be applied to one substrate and the other electrolyte, e.g., Electrolyte B, may be applied to another substrate. Thereafter, upon registered lamination of the substrates, the electrolytes may be united in contacting facing relation to form a composite electrolyte layer, whereby the printed substrates produce a functional electrochromic cell.

When printed in separate operations, first laminate substrate pass 70 is typically printed first and placed in roll or other storable form suitable for further processing at a later time. When lamination is desired, the roll comprising first pass 70 is then mounted onto an unillustrated infeed unit at registered laminating means 50. As second pass 80 is printed, first pass 70 is unwound, aligned and placed in registration with second pass 80 at means 50. Passes 70 and 80 are then affixed to each other and then positioned for further processing as a composite substrate at optional stations 63, 64, 66 and 68.

In two or more pass constructions, it is essential to the successful construction and operation of cell 10 that the individual passes are aligned and joined together such that the various functional components of cell 10 are in proper electrical communication with each other and that the graphic layers of cell 10 are aligned to produce the desired visual effect. To do so, the various passes are preferably aligned and joined together through an automated and continuously self-adjusting registration and lamination process at registered laminating means 50.

In the two pass construction of the battery tester label described above, first pass 70 is normally slightly stretched to fit second pass 80. In the case where multiple cells 10 are being printed on a web, the electrochromic cell components repeat pattern of first pass 70 is this constructed to be slightly shorter in length than the corresponding cell repeat pattern of second pass 80. The difference between first and second pass repeats may be as great as the printed layers of first pass 70 will allow, so long as the stretching of first pass 70 will not cause substrate 12 to break. For example, in the case of printing an electrochromic cell to be used as a battery tester incorporated into a label to be affixed to a battery, the difference in the repeats is generally about 0.01 inch. Accordingly, first pass 70 must be stretched approximately 0.01 inch per repeat so that it may be aligned with the corresponding repeats of second pass 80, thereby forming cells 10.

Registered lamination in accordance with the present invention may be achieved via suitably configured and cooperating automatic web tension control means (not illustrated) employed in conjunction with cooperating automatic web registration control means (also not illustrated) working in concert at registered laminating means 50 to produce two or more pass electrochromic devices. An exemplary arrangement may include a model number S-3000 web registration control device and a model number S-2152 web tension control device, both manufactured by The Bobst Group, Inc. of Roseland, N.J. Such a system may be used to control the pre-printed first pass 70 as it is unwound from an infeed unit at the registered laminator and joined with the second pass as the second pass exits the rotogravure press. Alternatively, registered laminating may be carried out in an off-line process where both passes 70 and 80 have been previously printed and rewound.

Critical to the automated registered lamination process is continuous monitoring of the stress characteristics of each pass during production. Improper stress placed on first pass 70 could cause delamination or curling of passes 70 and 80 once joined. When assembling an electrochromic battery tester label, for example, the amount of tension which should be placed in first pass 70 should be between about 0.5 pounds per linear inch (pli) of material and about 1.5 pli and preferably about 1.0 pli.

To achieve precise, substantially real-time control, the registered lamination means 50 preferably further comprises web position sensing means (not shown) for detecting certain physical characteristics of the first and second passes 70 and 80 as they traverse the registered laminating means 50. Such web sensing means are preferably electronically connected to a suitable system control device, e.g., a microprocessor (not shown), which continuously monitors the web sensing means and simultaneously controls the functions of the web tension control means and the web registration control means responsive to web position data received from the web sensing means. The web tension control means and web registration control means may be adapted to control the relative tensions and registrations of either or both or the first and second passes 70, 80.

Returning to the processing steps of the two pass embodiment of this invention depicted in FIG. 10, first pass 70 is constructed by first positioning, via positioner 24, substrate 12 in corona treatment station 40 where the dyne level of substrate 12 is increased. Substrate 12 is then positioned in one or more optional decorative ink printing stations 58 wherein decorative inks are applied. The inks applied may be of the same or different colors. Decorative inks may also be applied at print stations 58 to provide insulation between the various layers of cell 10.

Substrate 12 is then positioned in at least one electrode print station 26 and, thereafter, at least one voltage divider print station 42 as previously described. Next, substrate 12 is positioned in at least one dielectric print station 44 in which insulating dielectric ink 38 is applied. The thickness of dielectric applied at dielectric print station(s) 44 may be between about 0.2 and 1.5 mil, and is preferably about 1.0 mil. At this point, first pass 70 is completed and, as described above, either may be wound into a roll for subsequent processing or passed to registered laminating means 50. Following this, the substrate 12 receives one or more coatings of electrolyte material, e.g., Electrolyte A, at at least one electrolyte print station 28.

Second pass 80 is constructed by positioning base substrate 34 in corona treatment station 40 by means of positioner 54. Substrate 34 is then positioned in electrical insulation print station 60 wherein decorative ink or other suitable dielectric material is applied to substrate 34 as an insulator for counter electrode 18. The thickness of the ink applied at print station 60 may be between about 0.2 and 1.0 mil, and is preferably about 0.7 mil.

Substrate 34 is then positioned in at least one counter electrode print station 30 as described above. Substrate 34 is next positioned in notching station 56, wherein openings in printed substrate 34 may be provided through rotating die cutting or other suitable high speed means. Thereafter, substrate 34 is positioned in at least one electrolyte print station 28 for applying electrolyte material, e.g., Electrolyte A. Substrate 34 then may be positioned in an optional adhesive print station wherein a layer of laminating adhesive may be applied. Preferably, the adhesive is applied to only those areas of substrate 34 which are necessary to laminate the first and second passes 70 and 80 together at registered laminating means 50. That is, the adhesive must be printed such that it does not interfere with the functional or aesthetic characteristics of cell 10, e.g., it should not be printed where electrolyte material 16 is present. Lastly, substrate 34 is delivered to at least one additional electrolyte print station 28 where one or more layers of electrolyte material, preferably comprising a final layer of Electrolyte B, may be applied.

Figure 12:
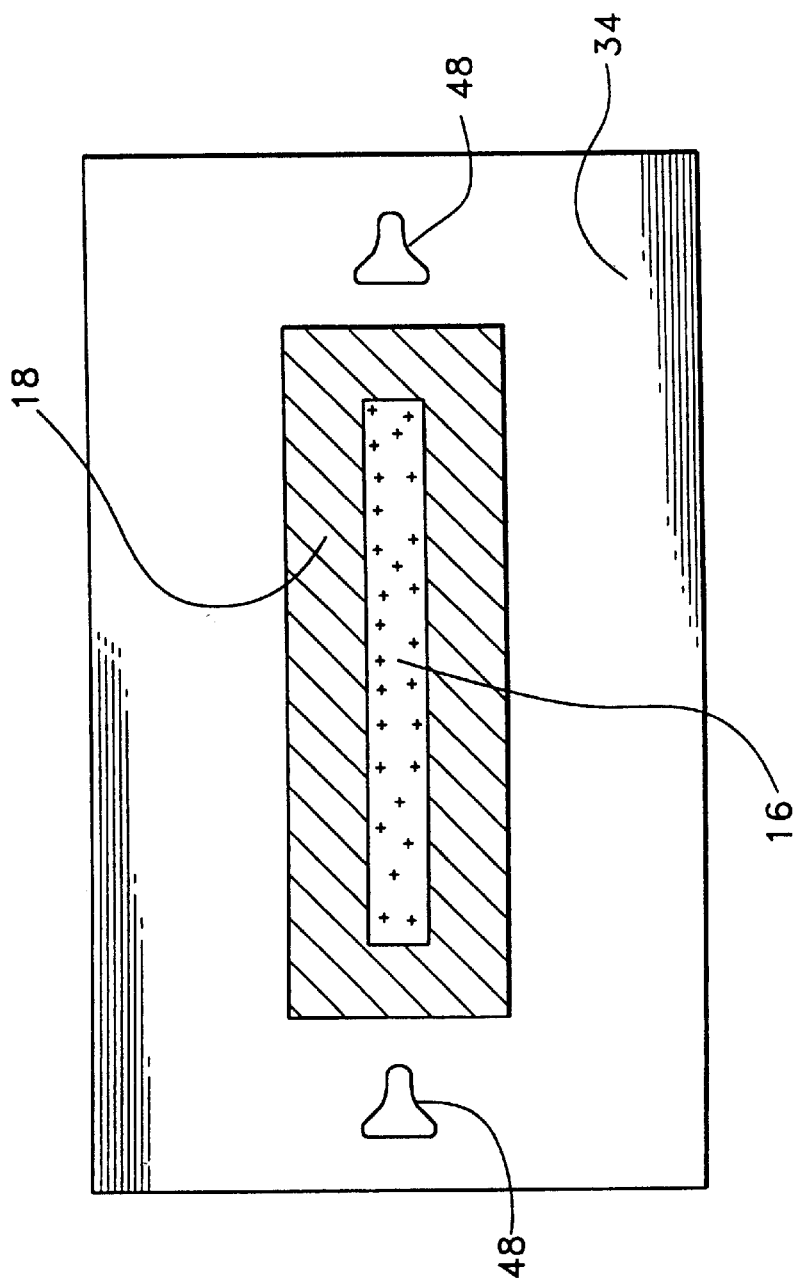
FIG. 12 is a plan view of certain components of a switching mechanism that may be produced by the methods and apparatus of the present invention.

Generally, openings in one or more layers of the electrochromic device may be formed by any means according to the process of this invention. For example, in forming a switching device in the battery tester described above, switch contact notches or openings 48 may be cut by notching means 56 through printed substrate 34 of second pass 80 as is depicted in FIG. 12. Any cutting means may be employed such as die cutting, and, preferably, rotating in-line die cutting techniques. The shape of openings 48 in FIG. 12 is but one presently preferred shape based upon factors such as size of the opening required, the viability of methods of cutting the openings, the location of the openings with respect to the layers of the electrochromic device and the intended function of the device. It should be noted, however, that no openings are required for cell 10 to function. That is, as many openings as desired may be employed depending upon the features and functions desired for the particular electrochromic device constructed.

Switch contact opening 48 of FIG. 12, openings 48 are provided to allow terminals 20 and 22 of voltage divider 36 to come into contact with the positive and negative electrodes of a dry cell battery to which cell 10 is attached. The switch is operated by depressing the layers above openings 48 (generally first pass 70 layers), such that terminals 20 and 22 contact the electrodes of the dry cell battery. It is critical, however, to the operation of this switch that the layers of cell 10 are properly registered and laminated so that terminals 20 and 22 are able to be placed in electrical communication with the battery terminals. Other uses of notching process 56 beyond openings 48 will be apparent from studying and practicing the invention disclosed herein.

Figure 13:
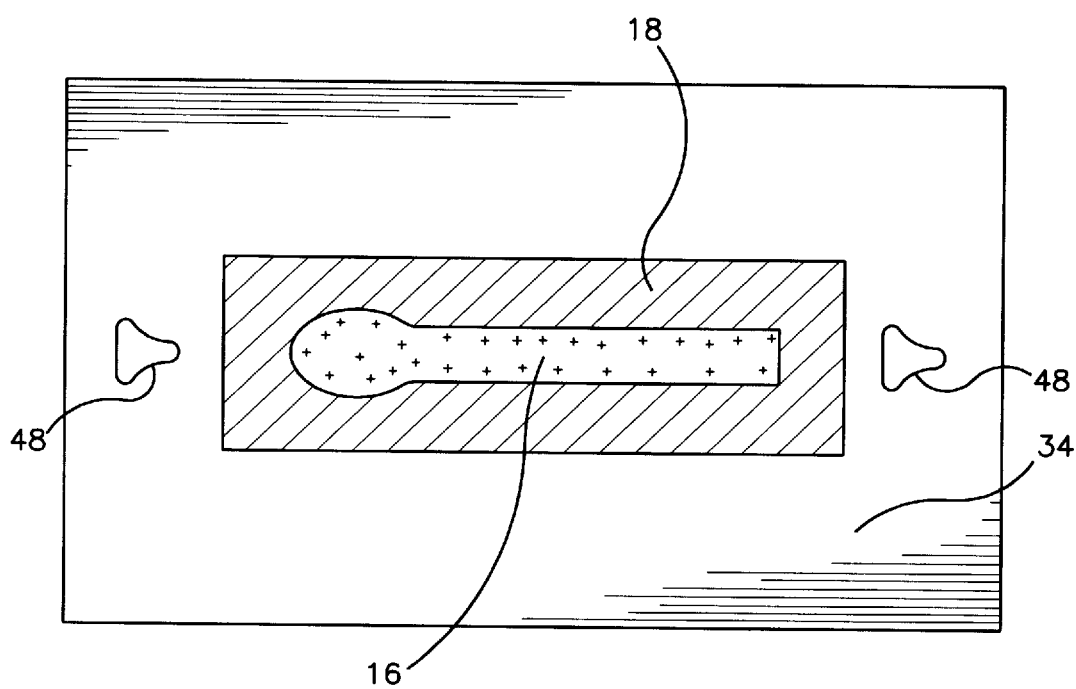
FIG. 13 is a plan view of certain components of a switching mechanism that may be produced by the methods and apparatus of the present invention.

FIG. 13 is a plan view of certain components of a switching mechanism that may be produced by the methods and apparatus of the present invention. FIG. 13 is an alternative embodiment of FIG. 12.

Figure 11:
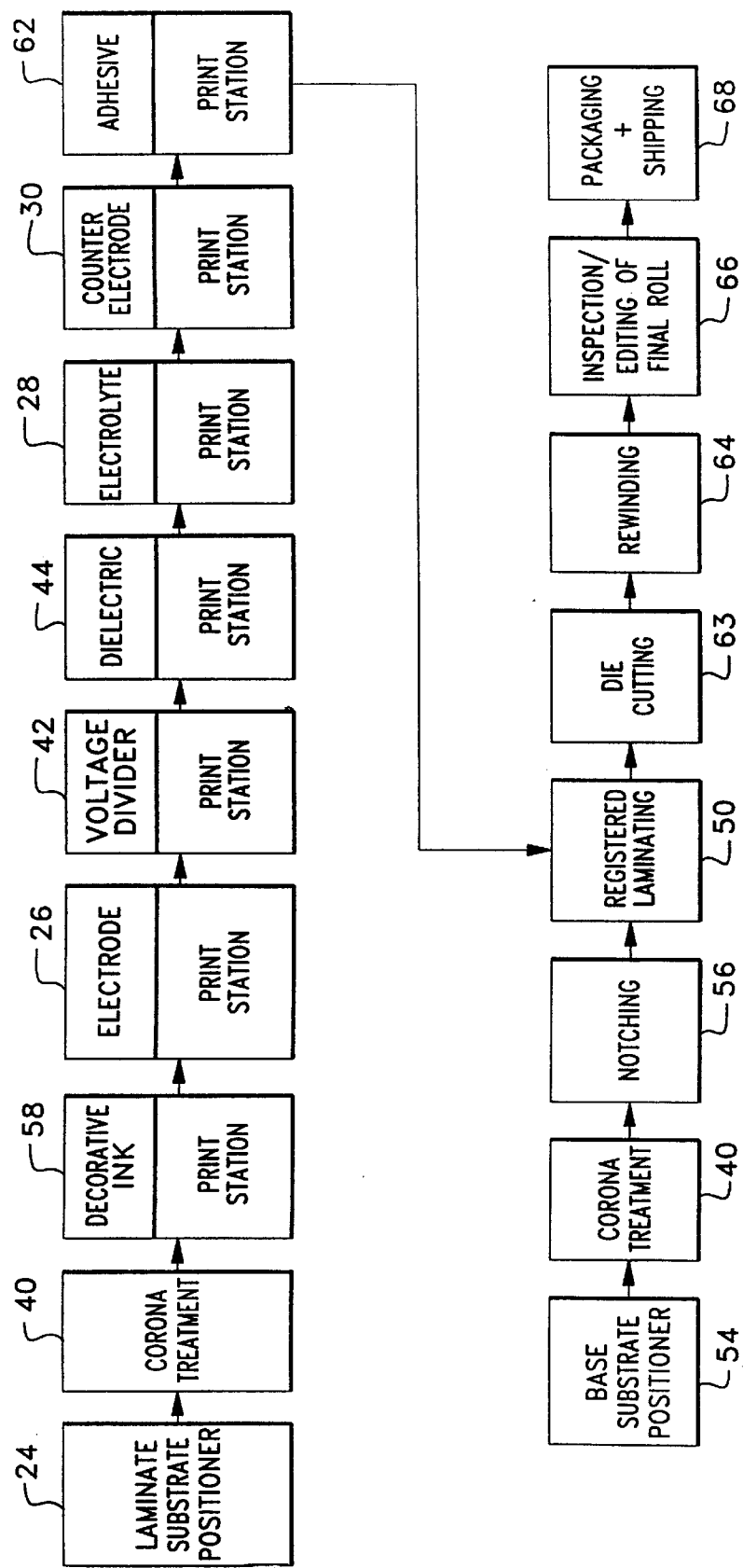
FIG. 11 is a schematic view of a single pass apparatus and method for assembling an electrochromic cell constructed according to the present invention.

FIG. 11 depicts a further embodiment of the invention. In this embodiment, printing of all layers comprising cell 10 occurs solely on laminate substrate 12. As in the embodiment of FIG. 10, substrate 12 is positioned by laminate substrate positioner 24 in corona treatment station 40 and is subsequently passed through at least one optional decorative ink print station 58, at least one electrode print station 26, at least one voltage divider print station 42 and dielectric print station 44.

However, instead of rewinding printed substrate 12 as in previously described first pass 70, substrate 12 passes directly to electrolyte print station(s) 28, counter electrode print station(s) 30 and patterned adhesive station 62. Substantially simultaneously with the printing of substrate 12, base substrate 34 is positioned in corona treatment station 40 by base substrate positioner 54, notched at notching station 56 and then precisely registered and laminated with printed substrate 12 at registered laminating means 50.

The composite structure is then die cut into individual cells 10 at die cutting station 63. This embodiment has the advantage that registration between printed substrate 12 and unpainted substrate 34 is not as critical as in multiple pass constructions because ink layers do not have to be aligned to exacting tolerances. Cells 10 are then rewound at rewind station 64, inspected at station 66 and packed and shipped at station 68, all of which may be manual or automated processes.

It should also be noted that in any presently contemplated embodiment, each print station (except any electrolyte print station which deposits tacky Electrolyte B ink) may include an ink drying means through which the printed web passes after the application of each printed layer. It is most desirable to evaporate the organic solvents and/or water present in each layer of ink in order to prevent blistering of the ink layer, and promote high quality deposition of subsequent layers. Drying of the inks and solvents employed in this invention are dependent upon several factors such as, for example, the pressure at which the inks are applied, the composition of the inks, the drying time required for such ink or solvent before the next succeeding layer is printed on top of the preceding layer. Drying time may be influenced by application of heat and/or air flow to the ink as it passes through the dryer. In most cases, it is vital to evaporate any water present in the ink prior to the application of subsequent layers. Although this is a problem primarily with water based inks, it is also of significance in regard to solvent based inks, which generally have better drying characteristics than water based inks but also may contain some water either in solution or by condensation introduced during the printing process.

In the case of the rotogravure press, the time allowed for drying a layer of ink may be increased by increasing the length of the web between printing stations. Conventionally, the length is increased by positioning the dryer for each print station above the print station. The dryer contains a series of adjustable guide rollers or dancers through which the web passes. Passing the web through the dancers increases the web distance between print cylinders. The dancers may be configured to make this distance any length desired.

Additionally, the dryer may contain heating elements, preferably infrared elements, as well as air blowers which increase or decrease the turbulence of the air flow present inside the dryer. Infrared heating elements are preferred because infrared and also works well on either water or solvent based inks. And, the turbulent blown air is preferably cool and dry.

It is evident that the proper combination of the drying variables of distance, time, temperature and air flow may vary widely with the ink employed at the result desired.

It will be appreciated that the foregoing is merely illustrative of various products, materials, apparatus and methods, all of which contribute to the whole of the present invention, whereby reliable electrochromic cells may be rapidly and cost effectively printed on flexible or rigid substrates to produce, without limitations, such diverse apparatus as graphics displays, wrist watch displays and voltage or state-of-charge indicators for batteries.

The present invention may be embodied in other specific forms without departing from its spirit or essential attributes. Accordingly, reference should be made to appended claims rather than the foregoing specification, as indicating the scope of the invention.

What is claimed is:

1. A printable electrolytic ink for an electrochromic cell, said electrolytic ink comprising:
   a plating agent;
   a humectant;
   a solvent; and
   a binding agent,
   wherein
   said binding agent is selected from the group consisting of polyvinyl butyral, polyvinyl chloride, acrylic, nitrocellulose, polysaccharide, hydroxyethyl cellulose, vinyl and a copolymer of vinyl chloride,
   said plating agent is selected from the group consisting of $WO_3$, $MoO_3$, $V_2O_5$, and $BiCl_3$, and
   said plating agent comprises from about 0.2 to about 1.0 weight percent of said ink.

2. The electrolytic ink of claim 1, wherein said plating agent is $BiCl_3$.

3. The electrolytic ink of claim 1, wherein said humectant is lithium bromide.

4. The electrolytic ink of claim 1, wherein said solvent is selected from the group consisting of water, alcohol and an aqueous alcohol solution.

5. The electrolytic ink of claim 4, wherein said solvent is a water and isopropyl alcohol solution.

6. The electrolytic ink of claim 4, wherein said binding agent is selected from the group consisting of polysaccharide, nitrocellulose, hydroxyethyl cellulose, acrylic, vinyl and a copolymer of vinyl chloride.

7. The electrolytic ink of claim 6, wherein said binding agent is polysaccharide.

8. A printable electrolytic ink for an electrochromic cell, said electrolytic ink comprising:
   a plating agent;
   a humectant;
   a solvent; and
   a binding agent,
   wherein
   said binding agent is selected from the group consisting of polyvinyl butyral, polyvinyl chloride, acrylic, nitrocellulose, polysaccharide, hydroxyethyl cellulose, vinyl and a copolymer of vinyl chloride, and
   said humectant is lithium bromide comprising from about 4 to about 10 percent of said electrolytic ink.

9. The electrolytic ink of claim 8, wherein said plating agent is selected from the group consisting of $WO_3$, $MoO_3$, $V_2O_5$, and $BiCl_3$.

10. The electrolytic ink of claim 8, wherein said solvent is selected from the group consisting of an alcohol, an acetate, an alcohol and acetate blend, a ketone, and toluene.

11. The electrolytic ink of claim 10, wherein
said alcohol is selected from the group consisting of ethyl, isopropyl, normal propyl and methyl alcohol,
said acetate is selected from the group consisting of ethyl, isopropyl, normal propyl, and methyl acetate, and
said alcohol and acetate blend is an ethyl alcohol and normal propyl acetate blend.

12. The electrolytic ink of claim 10, wherein said binding agent is selected from the group consisting of polyvinyl butyral, polyvinyl chloride, acrylic, nitrocellulose and a copolymer of vinyl chloride.

13. The electrolytic ink of claim 12, wherein said binding agent is polyvinyl butyral.

14. A printable electrolytic ink for an electrochromic cell, said electrolytic ink comprising:
a plating agent;
a humectant;
a solvent; and
a binding agent,
wherein
said binding agent is selected from the group consisting of polyvinyl butyral, polyvinyl chloride, acrylic, nitrocellulose, polysaccharide, hydroxyethyl cellulose, vinyl and a copolymer of vinyl chloride,
said solvent is selected from the group consisting of an alcohol, an acetate, an alcohol and acetate blend, a ketone, and toluene,
said alcohol is selected from the group consisting of ethyl, isopropyl, normal propyl an methyl alcohol,
said acetate is selected from the group consisting of ethyl, isopropyl, normal propyl, and methyl acetate,
said alcohol and acetate blend is an ethyl alcohol and normal propyl acetate blend, and
said solvent is an ethyl alcohol and normal propyl acetate blend.

15. A printable electrolytic ink for an electrochromic cell, said electrolytic ink comprising:
a plating agent;
a humectant;
a solvent; and
a binding agent,
wherein
said binding agent is selected from the group consisting of polyvinyl butyral, polyvinyl chloride, acrylic, nitrocellulose, polysaccharide, hydroxyethyl cellulose, vinyl and a copolymer of vinyl chloride,
said solvent is selected from the group consisting of an alcohol, an acetate, an alcohol and acetate blend, a ketone, and toluene, and
said solvent comprises for about 10 to a about 60 weight percent of said electrolytic ink.

16. A printable electrolytic ink for an electrochromic cell, said electrolytic ink comprising:
a plating agent;
a humectant;
a solvent; and
a binding agent,
wherein
said solvent is selected from the group consisting of an alcohol, an acetate, an alcohol and acetate blend, a ketone, and toluene,
said binding agent is selected from the group consisting of polyvinyl butyral, polyvinyl chloride, acrylic, nitrocellulose and a copolymer of vinyl chloride, and
said binding agent comprises from about 2 to about 30 weight percent of said electrolytic ink.

17. A printable electrolytic ink for an electrochromic cell, said electrolytic ink comprising:
a plating agent;
a humectant;
a solvent; and
a binding agent,
wherein
said binding agent is selected from the group consisting of polyvinyl butyral, polyvinyl chloride, acrylic, nitrocellulose, polysaccharide, hydroxyethyl cellulose, vinyl and a copolymer of vinyl chloride,
said solvent is selected from the group consisting of water, alcohol and an aqueous alcohol solution, and
said solvent comprises from about 15 to about 50 weight percent of said electrolytic ink.

18. A printable electrolytic ink for an electrochromic cell, said electrolytic ink comprising:
a plating agent;
a humectant;
a solvent; and
a binding agent,
wherein
said binding agent is selected from the group consisting of polyvinyl butyral, polyvinyl chloride, acrylic, nitrocellulose, polysaccharide, hydroxyethyl cellulose, vinyl and a copolymer of vinyl chloride,
said solvent is selected from the group consisting of water, alcohol and an aqueous alcohol solution,
said binding agent is selected from the group consisting of polysaccharide, nitrocellulose, hydroxyethyl cellulose, acrylic, vinyl and a copolymer of vinyl chloride, and
said binding agent comprises from about 2 to about 30 weight percent of said electrolytic ink.

19. The electrolytic ink of claim 18, further comprising a scrubbing agent.

20. The electrolytic ink of claim 19, wherein said scrubbing agent is copper (II) chloride.

21. The electrolytic ink of claim 18, further comprising means for resisting compression of said electrolytic ink when said electrolytic ink is deployed as a component of an electrochormic cell.

22. The electrolytic ink of claim 18, further comprising means for resisting compression of said electrolytic ink when said electrolytic ink is deployed as a component of an electrochromic cell.

23. The electrolytic ink of claim 22, wherein said means for resisting compression comprise a plurality of spheres.

24. The electrolytic ink of claim 23, wherein said spheres are formed from substantially rigid material.

25. The electrolytic ink of claim 23, wherein the diameter of said spheres is less than about 50 $\mu$m.

* * * * *